United States Patent
Hayashi

(10) Patent No.: US 7,420,700 B2
(45) Date of Patent: Sep. 2, 2008

(54) IMAGE PROCESSING SYSTEM, IMAGE FORMING SYSTEM, COMPUTER PROGRAM, AND RECORDING MEDIUM

(75) Inventor: Koji Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 816 days.

(21) Appl. No.: 10/804,069

(22) Filed: Mar. 19, 2004

(65) Prior Publication Data

US 2004/0239996 A1    Dec. 2, 2004

(30) Foreign Application Priority Data

Mar. 20, 2003   (JP)   ............... 2003-077239

(51) Int. Cl.
   *H04N 1/32*   (2006.01)
   *G06F 3/12*   (2006.01)
(52) U.S. Cl. ...................... 358/1.15; 358/442
(58) Field of Classification Search ................. 358/1.9, 358/2.1, 1.15–1.17, 442–443
   See application file for complete search history.

(56) References Cited

U.S. PATENT DOCUMENTS 5,227,842 A    7/1993    Hayashi et al.
5,270,783 A    12/1993   Bisaiji et al.
5,471,282 A    11/1995   Hayashi et al.
5,982,947 A    11/1999   Hayashi
6,055,071 A    4/2000    Kuwata et al.
6,160,922 A    12/2000   Hayashi
6,185,007 B1   2/2001    Hayashi et al.
6,271,934 B1   8/2001    Hayashi
2003/0085865 A1*  5/2003   Lee et al. ............... 345/98

FOREIGN PATENT DOCUMENTS

JP    2001-274993    10/2001

* cited by examiner

*Primary Examiner*—Thomas D Lee
*Assistant Examiner*—Stephen M Brinich
(74) *Attorney, Agent, or Firm*—Oblon, Spivak, McClelland, Maier & Neustadt, P.C.

(57) ABSTRACT

An image processing system includes an image input unit having a plurality of image input channels; a parallel image data processing unit that receives image data from the image input channels of the image input unit, divides the image data received into a plurality of divided data, each divided data including data in a number that is less than a predetermined number, and processes in parallel the divided image data; and a sequential image data processing unit that sequentially processes the divided image data output from the image parallel data processing unit while switching the divided image data for the image input channels.

13 Claims, 27 Drawing Sheets

| 0 | 1 | 2 | 1 | 0 |
|---|---|---|---|---|
| 1 | 2 | 4 | 2 | 1 |
| 0 | 1 | 2 | 1 | 0 |

FIG.7

PLACIAN FILTER

| 0 | -1 | 0 |
|---|----|---|
| -1 | 4 | -1 |
| 0 | -1 | 0 |

FIG.8

SLOW-SCAN DIRECTION EDGE DETECTION FILTER

| 1 | 1 | 1 | 1 | 1 |
|---|---|---|---|---|
| 1 | 1 | 1 | 1 | 1 |
| 0 | 0 | 0 | 0 | 0 |
| -1 | -1 | -1 | -1 | -1 |
| -1 | -1 | -1 | -1 | -1 |

FIG.9

FAST-SCAN DIRECTION EDGE DETECTION FILTER

| 1 | 1 | 0 | -1 | -1 |
|---|---|---|----|----|
| 1 | 1 | 0 | -1 | -1 |
| 1 | 1 | 0 | -1 | -1 |
| 1 | 1 | 0 | -1 | -1 |
| 1 | 1 | 0 | -1 | -1 |

FIG.10

DIAGONAL DIRECTION DETECTION FILTER 1

| 0  | 1  | 1  | 1  | 1 |
|----|----|----|----|---|
| 1  | 0  | 1  | 1  | 1 |
| -1 | 0  | 0  | 1  | 1 |
| -1 | -1 | -1 | 0  | 1 |
| -1 | -1 | -1 | -1 | 0 |

FIG.11

DIAGONAL DIRECTION DETECTION FILTER 2

| 1 | 1  | 1  | 1  | 0  |
|---|----|----|----|----|
| 1 | 1  | 1  | 0  | -1 |
| 1 | 1  | 0  | 0  | -1 |
| 1 | 0  | -1 | -1 | -1 |
| 0 | -1 | -1 | -1 | -1 |

| 1 | 2 | 1 |
|---|---|---|

ADAPTIVE EDGE ENHANCEMENT TABLE

POSITIONAL RELATION OF PIXELS

CONFIGURATION DIAGRAM OF IIR TYPE FILTER SYSTEM

FIG.25

| a | b | c | d | e |
| f | g | h | i | j |
| k | l | * |   |   |

FIG.26

| -1 | -1 | 0 | 1 | 1 |
| -1 | -1 | 0 | 1 | 1 |
| -1 | -1 | 0 | 1 | 1 |
| -1 | -1 | 0 | 1 | 1 |
| -1 | -1 | 0 | 1 | 1 |

| -1 | -1 | -1 | -1 | -1 |
| -1 | -1 | -1 | -1 | -1 |
| 0 | 0 | 0 | 0 | 0 |
| 1 | 1 | 1 | 1 | 1 |
| 1 | 1 | 1 | 1 | 1 |

| -1 | -1 | -1 | -1 | 0 |
| -1 | -1 | -1 | 0 | 1 |
| -1 | -1 | 0 | 1 | 1 |
| -1 | 0 | 1 | 1 | 1 |
| 0 | 1 | 1 | 1 | 1 |

| -1 | -1 | -1 | -1 | 0 |
| -1 | -1 | -1 | 0 | 1 |
| -1 | -1 | 0 | 1 | 1 |
| -1 | 0 | 1 | 1 | 1 |
| 0 | 1 | 1 | 1 | 1 |

| 4 | 6 | 3 | 2 |
|---|---|---|---|
| 5 | 6 | 1 | 1 |
| 6 | 3 | 2 | 4 |
| 6 | 1 | 1 | 5 |

→ FAST-SCAN DIRECTION

↓ FAST-SCAN DIRECTION

| 3 | 6 | 5 | 2 |
|---|---|---|---|
| 4 | 6 | 1 | 1 |
| 6 | 5 | 2 | 3 |
| 6 | 1 | 1 | 4 |

→ FAST-SCAN DIRECTION

↓ FAST-SCAN DIRECTION

IMAGE PROCESSING SYSTEM, IMAGE FORMING SYSTEM, COMPUTER PROGRAM, AND RECORDING MEDIUM

CROSS-REFERENCE TO RELATED APPLICATIONS

The present document incorporates by reference the entire contents of Japanese priority document, 2003-077239 filed in Japan on Mar. 20, 2003.

BACKGROUND OF THE INVENTION

1. Field of the Invention

The present invention relates to an image processing system that error-diffuses and outputs the image data by SIMD (single instruction multiple data stream) type processor and one sequential processor.

2. Description of the Related Art

Presently, there is know an MFP (multi function peripheral) which is formed as a composite apparatus of an image forming system such as copiers, facsimiles, printers, and scanners. By installing an SIMD (Single Instruction Multiple Data Stream) type processor and auxiliary processor to such an MFP image processor and properly using the two in accordance with the classification of image processing, images are processed at high speed and programmably. Because the SIMD type processor enters multiple data used for processing at a time and processes the multiple data entered in parallel, the SIMD type processor has advantages of processing a large amount of data at a time and processes operations in a short time.

There is one approach of image processing that gives high processing speed by performing processing in parallel at the SIMD type processor and another approach of image processing that gives higher processing efficiency by performing processing by sequential operations. As one example of image processing in which the use of the SIMD type processor is disadvantageous, error diffusion processing can be mentioned. Error diffusion processing is the processing to reflect the difference (error) between the image data value of each pixel and the predetermined threshold value in the image data processing of other pixel when the image data is expressed as an electrostatic latent image on the image bearer or a visual image by toner. In error diffusion processing, the image is handled as the line (pixel line) composed with pixels arranged only in the fast-scan direction as multiple lines arranged in the slow-scan direction. The processing which is advantageous in using the SIMD type processor in error diffusion processing corresponds to error diffusion processing which is carried out between pixels included in pixel lines which are different to each other. In addition, processing in which sequential processing is advantageous corresponds to the error diffusion processing which is carried out between pixels which are included in the same pixel line.

As against to this, as disclosed in the Japanese Patent Application Laid-Open No. 2001-274993, when error diffusion processing is carried out by a conventional image processing unit, error diffusion processing carried out between pixels included in different pixel lines is executed in the SIMD type processor and error diffusion processing carried out between pixels included in the same pixel line is executed at a sequential image data processor which sequentially carries out error diffusion processing.

In the technology disclosed in the above-mentioned literature, error diffusion processing can be used when one-input image data is error-diffused as is the case of black-and-white copiers, and in color copiers, error diffusion processing can be used to form color images by overlapping images on a transfer belt, transfer paper, and other image bearers, but it has a problem of applying error diffusion processing to processing in which YMCK image data nearly simultaneously flow to each of a plurality of photoreceptor drums (image bearers) with a time difference in which transfer paper moves from one photoreceptor to the other.

SUMMARY OF THE INVENTION

It is an object of the present invention to solve the problems in the conventional technology.

An image processing system according to an aspect of the present invention includes an image input unit having a plurality of image input channels; a parallel image data processing unit that receives image data from the image input channels of the image input unit, divides the image data received into a plurality of divided data, each divided data including data in a number that is less than a predetermined number, and processes in parallel the divided image data; and a sequential image data processing unit that sequentially processes the divided image data output from the image parallel data processing unit while switching the divided image data for the image input channels.

An image forming system according to another aspect of the present invention includes the image processing system according to the above aspect and an image forming unit that formes visible images on a recording medium using the image data output by the image processing system.

An image processing method according to still another aspect of the present invention includes receiving image data from a plurality of image input channels; dividing the image data received into a plurality of divided data, each divided data including data in a number that is less than a predetermined number; processing in parallel the divided image data; and sequentially processing the divided image data processed at the processing while switching the divided image data for the image input channels.

A computer program according to still another aspect of the present invention makes a computer realize the image processing method according to the above aspect of the present invention.

A computer-redable recording medium according to still another aspect of the present invention stores the computer program according to the above aspect of the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is an example of a smoothing filter coefficient;

FIG. 7 is an example of Laplacian filter coefficient;

FIG. 8 is an example of the coefficient of slow-scan direction edge detection filter;

FIG. 9 is an example of the coefficient of fast-scan direction edge detection filter;

FIG. 10 is an example of the coefficient of diagonal direction detection filter;

FIG. 11 is the another example of the coefficient of diagonal direction detection filter;

FIG. 12 is an example of the second smoothing filter coefficient;

FIG. 25 is a diagram to explain the matrix condition of the error diffusion matrix unit;

FIG. 26 shows an example of a differential filter used at the edge detection unit;

DETAILED DESCRIPTION

Exemplary embodiments of the present invention will now be explained with reference to the accompanying drawings.

Figure 1:
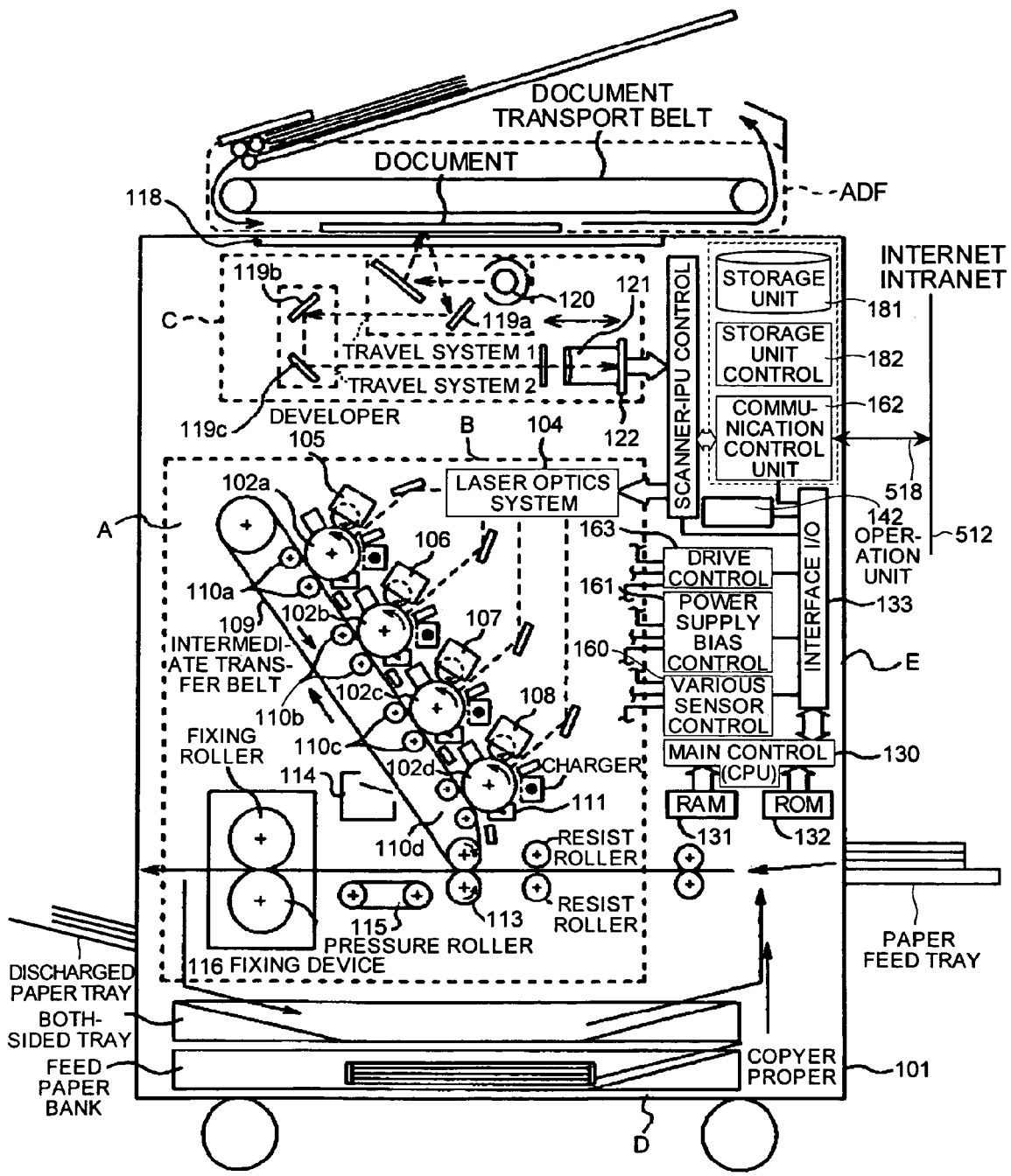
FIG. 1 is a side view of internal structure of a color copier according to an embodiment of the present invention.

FIG. 1 is a general configuration of a color copier related to one embodiment according to the present invention. In the structure shown in FIG. 1, an image forming system A is located at the nearly the center of the copier proper 101, a light writing system B is located above the image forming system A, a reading system C is located above the light writing system B, a paper feeding system D is located below the image forming system A, and a control system E is located from the side to the top of the image forming system A. In addition, at the top of the copier proper 101, an automatic document feeder (ADF) is disposed.

The image forming system A comprises an intermediate transfer belt 109 as an image bearer, four photoreceptor drums 102a, 102b, 102c, 102d for black, cyan, magenta, and yellow installed along the top surface of this intermediate transfer belt 109 and various kinds of image-forming elements installed on the outer circumference of each of photoreceptor drums 102a to 102d. The image forming elements include chargers installed along the outer circumference of each of photoreceptor drums 102a to 102d, respectively, a laser optic system 104 which irradiates surfaces of charged photoreceptor drums 102a to 102d with semiconductor laser beam to form electrostatic latent images, developers 105, 106, 107, 108 for supplying each color toner to the electrostatic latent images on photoreceptor drums 102a to 102d, developing, and obtaining toner images for each color, bias rollers (transfer rollers) 110a, 110b, 110c, 100d for applying transfer voltage to relevant intermediate transfer belt 109 to transfer the toner image of each color formed on photoreceptor drums 102a to 102d successively to the intermediate transfer belt 109, cleaning device 111 (installed to each of photoreceptor drums 102a to 102d, respectively) to remove toner remaining on the surfaces of photoreceptor drums 102a to 102d after transferring, and static eliminators for eliminating electric charges remaining on the surfaces of photoreceptor drums 102a to 102d after transferring, and are arranged successively along the outer circumferential surface of photoreceptor drums 102a to 102d in that order. In addition, to the intermediate transfer belt 109, a transfer bias roller 113 for applying voltage to transfer toner image to transfer material and a belt cleaning device 114 for cleaning toner images remaining after transferring images to the transfer material are disposed.

In addition, on the downstream side in the paper transporting direction of the intermediate transfer belt 109, a transport belt 115 for transporting the transfer material (paper) with a color image transferred and a fixing device 116 for fixing the transferred image to the transfer material are arranged, and further downstream from them, a paper delivery tray 117 is located. By the way, the fixing device 116 fixes the toner image transferred to the surface of transfer material by heating and pressurizing, and functions as a fixing system together with the transport belt 115.

The reading optical system C guides light to a contact glass 118 as a document mount arranged at the top of the copier proper 101, an exposure lamp 120 for irradiating the document on this contact glass 118 with scanning light, first to third mirrors 119a, 119b, 119c, and to a image forming lens 121 by the first to third mirrors 119a to 119c, and inputs light to an image sensor array 122 of CCD (charge coupled device), photoelectric conversion element. The image signal converted to electric signals at CCD image sensor array 122 controls laser oscillation of semiconductor laser in the laser optics system 104 of the light writing system B via an image processing system not illustrated. By the way, the exposure lamp 120, reflection mirror 120a and first mirror 119a are mounted to the travel system 1 and the second and the third mirrors 119b, 119c are mounted to the travel system 2, respectively, and move at the speed ratio of 2 to 1, and are driven in such a manner that the light path length of the reading light impinging from the document surface to the image sensor array 122 is not changed in accord with the reading position.

Figure 2:
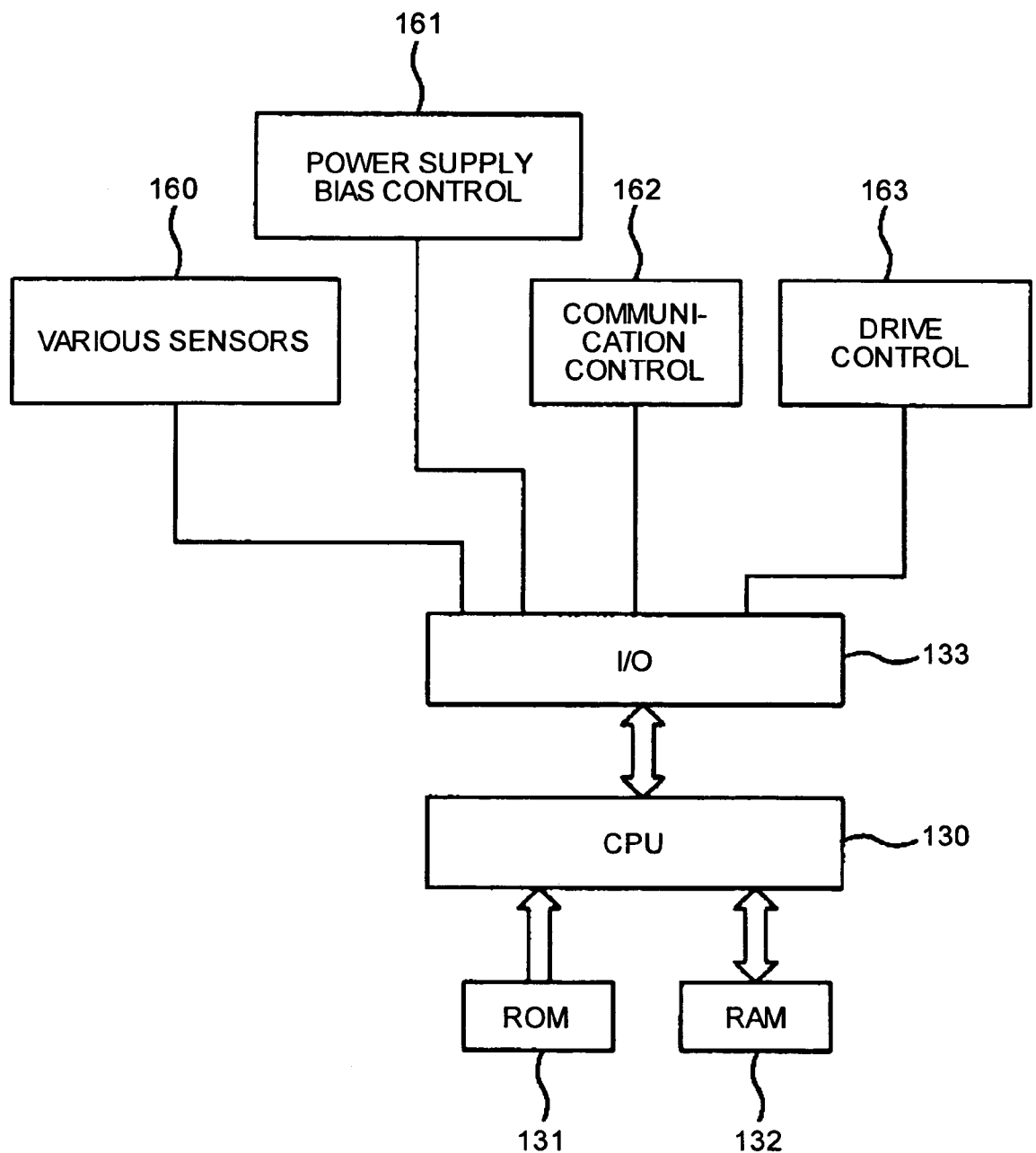
FIG. 2 is a block diagram of a control system of the color copier.
Figure 3:
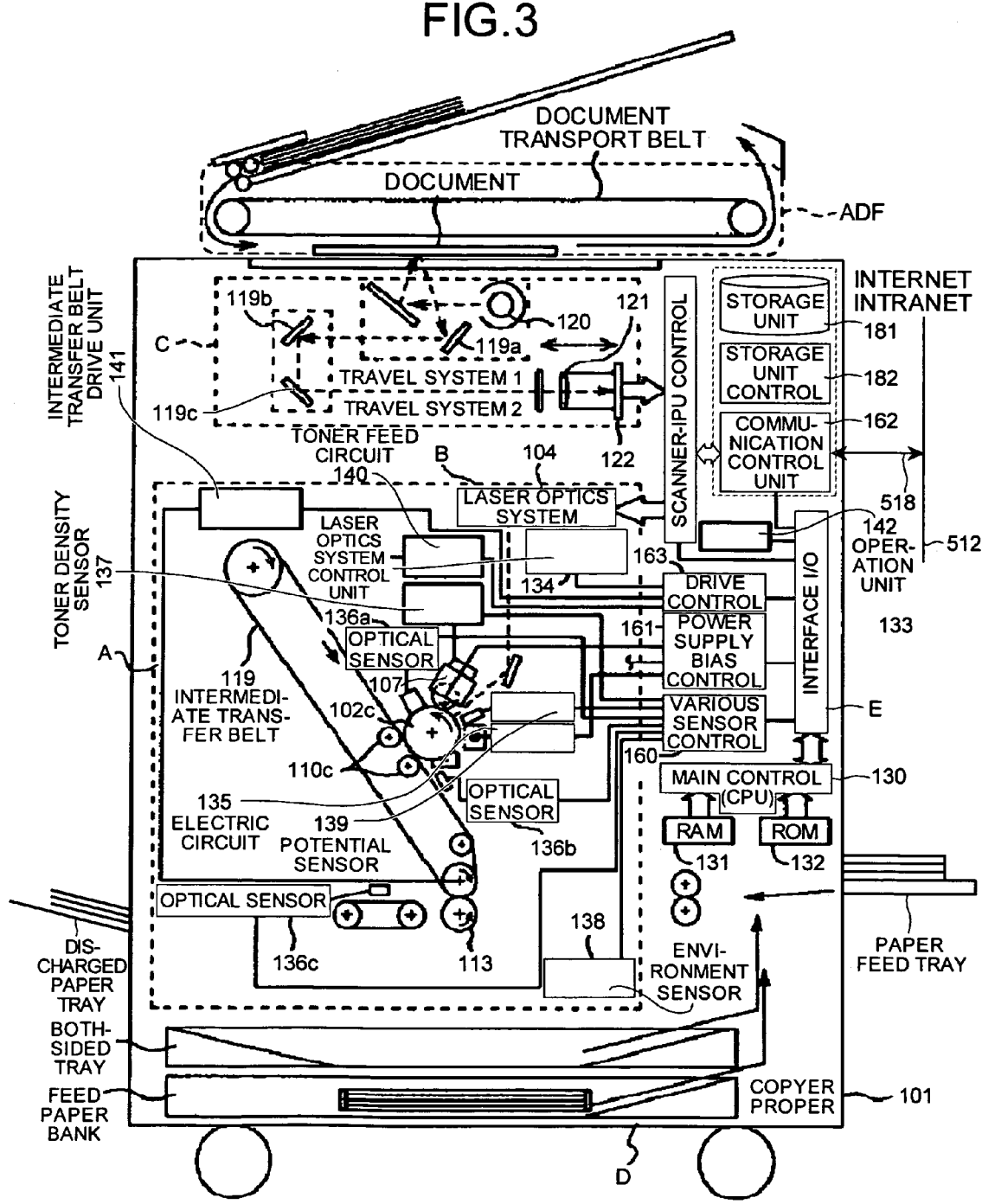
FIG. 3 is a side view of a control system of the color copier.

Referring now to FIG. 2 and FIG. 3, the control system E incorporated in the copier proper 101 will be discribed.

FIG. 2 is a block diagram illustrating a general configuration of the control system E. In the structure shown in FIG. 2, the control system E is equipped with a main control unit (which is a central processing unit (CPU)) 130, and to this main control unit 130, specified ROM131 and RAM132 are installed and at the same time, to the main control unit 130, various sensors control unit 160, power supply-bias control unit 161, communication control unit 162, drive control unit 163, operation unit 142, scanner-IPU control unit, etc. are connected via interface I/O 133 as depicted in FIG. 3 to control the copier inside or communicate with the inside and the outside of the copier.

To the various sensors control unit 160, an environment sensor 138, optical sensors 136a, 136b, 136c, photoreceptor surface potential sensor 139 and toner density sensor 137 are connected, while to the power supply-bias control unit 161, an electric circuit 135 and developers 105, 106, 107, 108 are connected, and to a drive control unit 163, laser optics system control unit 134, toner feed circuit 140, and intermediate transfer belt drive unit 141 are connected. The laser optics system control unit 134 adjusts laser output of the laser optics system 104, and the power supply circuit 135 gives the specified discharge voltage for charging to the transfer bias roller 113, and from the power supply-bias control unit 161, the developing bias of a specified voltage is given to the developers 105, 106, 107, 108, and a specified transfer voltage to bias rollers 110a to 110d and transfer bias roller 113.

A communication control unit 162 is connected to the Internet or Intranet (trademark) 512 via communication line 518 and at the same time, controls a storage unit 181 via a storage unit control unit 182.

By the way, optical sensors 136a to 136c are located opposite to photoreceptor 102, respectively, the optical sensor 136a for detecting the toner adhering rate on the photoreceptor 102 is located opposite to the transfer belt 109, the optical sensor 136b for detecting the toner adhering rate on the transfer belt 109 is located opposite to the transport belt 115, and the optical sensor 136c for detecting the toner adhering rate on the transport belt 115 is illustrated. Practically, any one of the optical sensors 136a to 136c (hereinafter generally shown by reference numeral 136) should be detected.

The optical sensor 136 comprises light-emitting elements such as light-emitting diodes, etc. arranged adjacent to the transferred area of the photoreceptor drum 102 and light-receiving elements such as photosensors, etc., and the toner adhering rate in toner images of detected pattern latent image formed on the photoreceptor drum 102 and toner adhering rate in the surface unit are detected in accord with each color, respectively, and so-called residual potential after static electricity of the photoreceptor is eliminated is detected. The detection output signals from this optical sensor 136 are applied to the optical sensor control unit whose illustration is omitted. The optical sensor control unit finds the ratio of the toner adhering rate in the detected pattern toner image to the toner adhering rate in the surface unit, compares the ratio to the reference value, detects variations of the image density, and corrects the control value of a toner density sensor 137.

Furthermore, the toner density sensor 137 detects the toner density based on the magnetic permeability of developing agent existing in developers 105 to 108. The toner density sensor 137 compares the detected toner density with the reference value, and has a capability to apply the toner replenishing signal of the size corresponding to the shortage to a toner supply circuit 140, when the toner density lowers a specified value and the toner short condition occurs. A potential sensor 139 detects the surface potential of the photoreceptor 102, the image bearer, and an intermediate transfer belt drive unit 141 controls the drive of intermediate transfer belt.

In a black developer 105, a developing agent containing black toner and carrier is housed, and is agitated by the rotation of an agent agitating member and adjusts the amount of developing agent which is pumped up onto a sleeve by a developing agent controlling member. This supplied developing agent rotates in the rotating direction of the developing sleeve as a magnetic brush while it is magnetically held on the developing sleeve.

Figure 4:
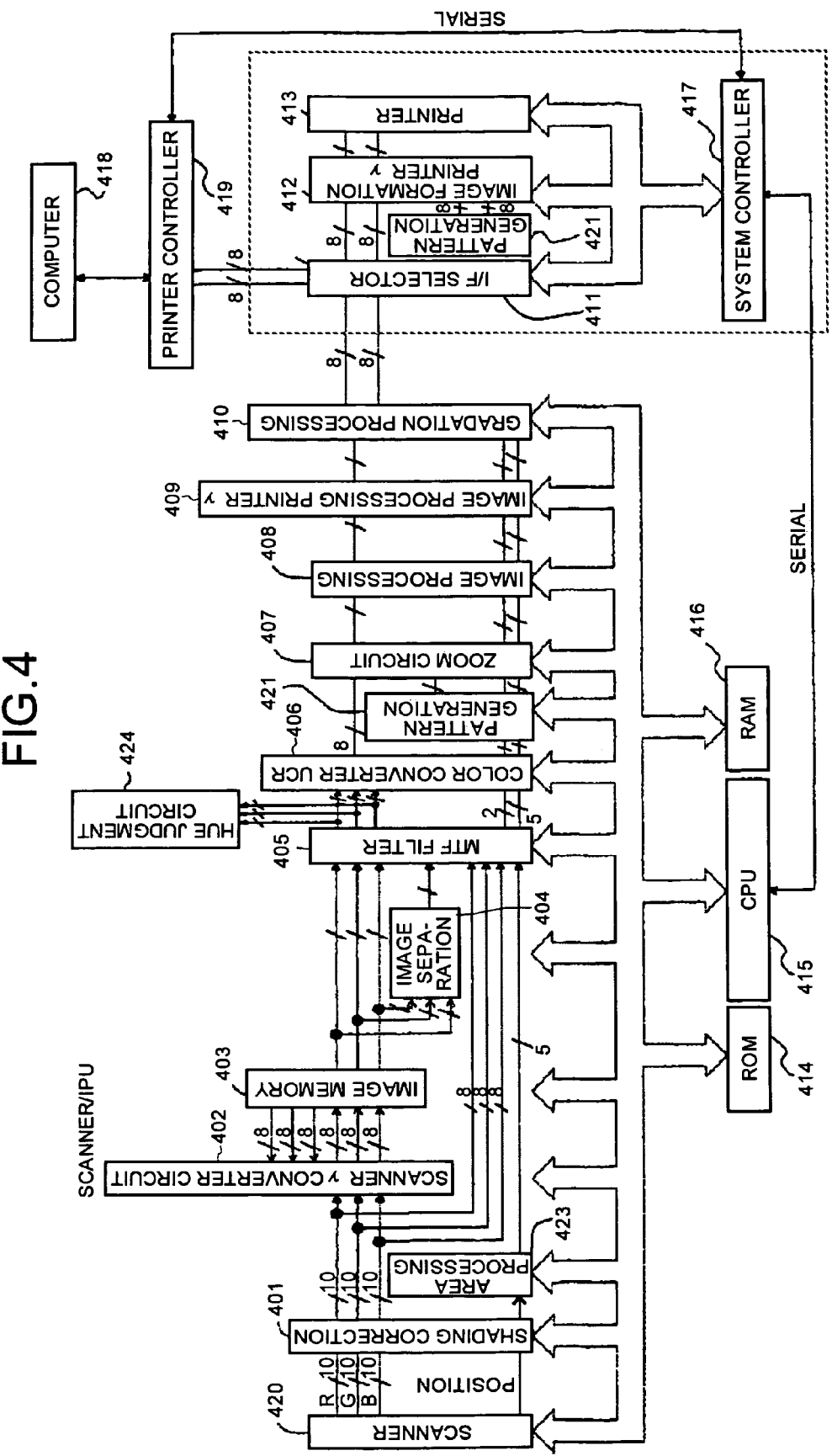
FIG. 4 is a block diagram of an image processor of the color copier.

FIG. 4 is a block diagram to explain a configuration of an image processor. In the structure shown in FIG. 4, reference numeral 420 denotes a scanner, 401 a shading correction circuit, 423 an area processing circuit, 402 a scanner γ-converter circuit, 403 an image memory, 404 an image separation circuit, 405 an MTF filter, 406 a color converter UCR circuit, 407 a zoom circuit, 408 an image processing (create) circuit, 409 an image processing printer γ-converter circuit, 410 gradation processing circuit, 411 an interface (I/F) selector, 412 an image formation printer γ-correction circuit, 413 a printer, 414 ROM, 415 CPU, 416 RAM, 417 a system controller, 418 an external computer, 419 a printer controller, and 421 a pattern generation circuit.

The document to be copied has color separated into R, G, B by a color scanner 420 and read in, for example, 10-bit signals. The read image signals have irregularities in the fast-scan direction corrected by the shading correction circuit 401 and output in 10-bit signals. In the area processing 423, an area signal is generated to distinguish to which area in the document the image data currently in processing belongs. By the area signal generated by this circuit, parameters used in the image processor in the subsequent stages are changed over. These areas are able to have image processing parameters, such as color correction coefficients, space filters, gradation conversion tables, etc. suited for relevant documents, including texts, silver halide photographs (photographic papers), documents ready for printing, ink jet, highlighter pens, maps, thermal transfer documents, etc. in accord with the relevant image areas.

In the scanner γ-converter circuit 402, the signals read from a scanner are converted from reflectance data to brightness data. The image memory 403 stores image signals after scanner γ-conversion in memory. In the image separation circuit 404, a text unit and a photograph unit are judged and chromatic color and achromatic color are judged.

In the MTF filter 405, edge enhancement processing (adaptive edge enhancement processing) in accordance with the edge degree of image signal is carried out in addition to the processing for changing frequency characteristics of image signals such as edge enhancement and smoothing, etc. in accordance with the user preference, such as sharp images, soft images, etc. For example, so-called adaptive edge enhancement such as providing edge enhancement to text edges but providing no edge enhancement to halftone images is carried out for each of R, G, and B signals.

Figure 5:
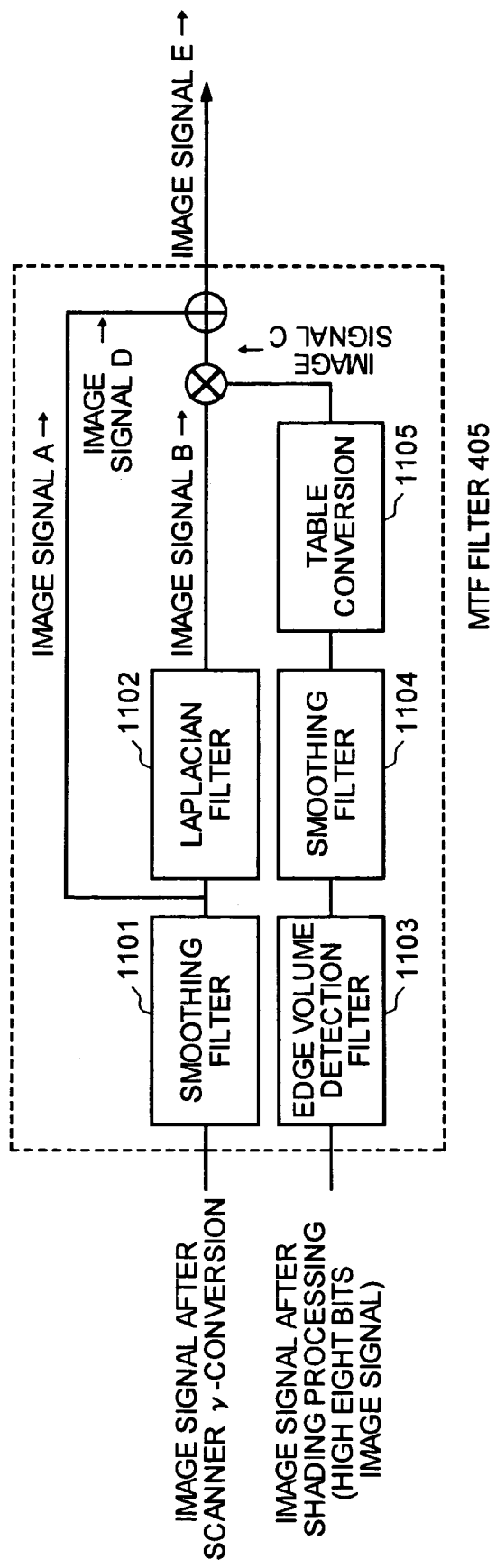
FIG. 5 is a block diagram of an adaptive edge enhancement circuit.

FIG. 5 shows an example of an adaptive edge enhancement circuit. The adaptive edge enhancement circuit comprises a first smoothing filter 1101, Laplacian filter 1102, edge volume detection filter 1103, a second smoothing filter 1104, and a table conversion unit 1105. The image signal converted from reflectance linear to brightness linear at the scanner γ-conversion circuit 402 is smoothed by the first smoothing filter circuit 1101. For a smoothing filter, for example, the coefficient shown in FIG. 6 is used.

The image signal smoothed at the first smoothing filter 1101 has the differential components of the image data extracted by the 3×3 Laplacian filter 1102 of the next stage. The Laplacian filter 1102 is, specifically speaking, a coefficient, for example, as shown in FIG. 7. Of the 10-bit image signals which are not γ-converted at the scanner γ-conversion circuit 402, high 8-bit components (an example) are edge-detected by the edge volume detection filter 1103. Specific examples of the edge volume detection filter are shown in FIG. 8 to FIG. 11. FIG. 8 shows an example of slow-scan direction edge detection filter, FIG. 9 shows an example of fast-scan direction edge detection filter, FIG. 10 shows an example of diagonal direction detection filter 1, and FIG. 11 shows an example of diagonal direction detection filter 2. Of these edge volumes obtained by the edge detection filters shown in FIG. 8 to FIG. 11, the highest value is used for the edge degree in the subsequent stage. The edge degree is smoothed by the second smoothing filter 1104 of the subsequent stage. By this, effects of sensitivity difference between even-number pixels and odd-number pixels of a scanner can be alleviated. For the second smoothing filter, the coefficient shown, for example, in FIG. 12 is used.

Figure 13:
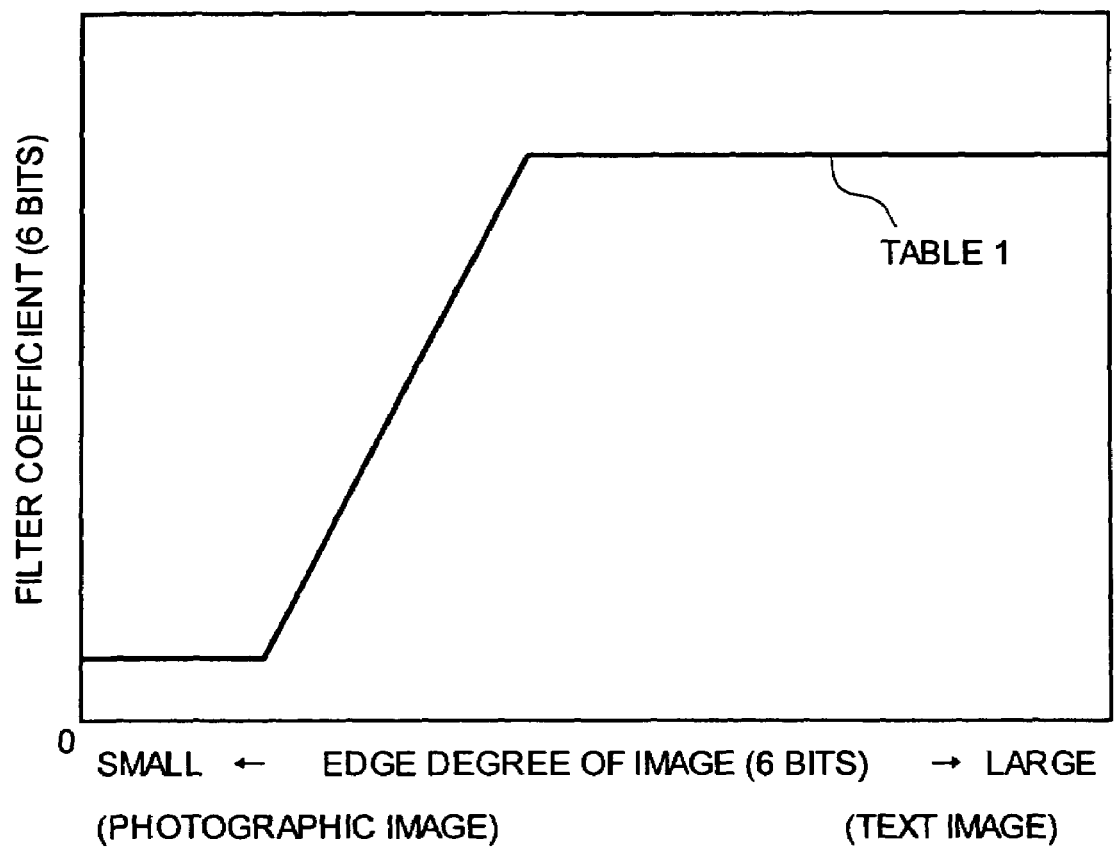
FIG. 13 is a graph of the filter coefficient vurses edge degree.

The image signal smoothed out by the second smoothing filter 1104 has the found edge degree table-converted by the table conversion circuit 1105. By this table values, thickness of lines and points (including contrast and density) as well as smoothness of halftone unit can be specified. FIG. 13 shows an example of the table. The edge degree becomes the greatest with black lines, points, etc. on the white background, and is reduced as the boundary of pixels is smoother such as finely printed halftones, silver-halide photographs, thermal transfer documents, etc. And the product (image signal D) of the edge degree (image signal C) converted by the table conversion circuit 1105 by the output (image signal B) of Laplacian filter 1102 is added to the image signal (image signal A) after smoothing and is transmitted to the image processing circuit of the subsequent stage as the image signal E.

The color converter UCR processing circuit 406 comprises a color correction processor for correcting a difference between color separation characteristics of the input system and spectral characteristics of color materials of the output system and computing the amount of color materials YMC required for faithful color reproduction and a UCR processor for replacing the portion at which three colors of YMC overlap with Bk (black). The color correction processing can be achieved by carrying out the matrix operation of the following equation.

$$\begin{bmatrix} Y \\ M \\ C \end{bmatrix} = \begin{bmatrix} a11 & a12 & a13 \\ a21 & a22 & a23 \\ a31 & a32 & a33 \end{bmatrix} \begin{bmatrix} B \\ G \\ R \end{bmatrix} \quad (1)$$

where, R, G, B denote complements of R, G, B. The matrix coefficient aij is determined by the spectral characteristics of the input system and output system (color materials). In this case, the primary masking equation is taken as an example, but the color can be corrected more accurately by using the term of second degree such as B2, BG, etc. or the term of still higher degree. In addition, the operation equation may be changed in accord with the hue or the Neugebauer equation may be used. Whichever method should be used, Y, M, C can be found from the values of B, G, R (or Y, M, C may be B, G, R).

On the other hand, UCR processing can be carried out by performing operations using the following equation:

$$Y'=Y-\alpha \cdot \min(Y,M,C)$$

$$M'=M-\alpha \cdot \min(Y,M,C)$$

$$C'=C-\alpha \cdot \min(Y,M,C)$$

$$Bk'=\alpha \cdot \min(Y,M,C) \quad (2)$$

In the equations above, α is a coefficient which determines the volume of UCR and when α=1, 100% UCR processing takes place. Alpha (α) may be a constant value. For example, by bringing α close to 1 in the high density unit and bringing α close to 0 at the high-lighted unit (low-image density unit), the image in the highlight unit can be smoothened.

The above-mentioned color correction coefficient varies in accord with 14 hues, which are obtained by dividing six hues of RGBYMC into two to have 12 hues, to which black and white are further added. The hue judgment circuit 424 determines to which hue the read image data is classified. Based on the judged results, the color correction coefficient is chosen for each color hue.

In the zoom circuit 407, vertical and horizontal zooms take place and in the image processing (create) circuit 408, repeat processing, etc. are carried out. In the printer γ-correction circuit 409, image signals are corrected in accord with the picture quality mode such as texts, photographs, etc. It is also possible to carry out "white-background skipping" simultaneously. Printer γ-correction circuit 409 has multiple pieces (for example, 10 pieces) of switchable gradation conversion tables in response to area signals which the area processing circuit 402 generates. This gradation conversion table can select the gradation conversion table suited for relevant originals from multiple image processing parameters, such as texts, silver-halide photographs (photographic paper), documents ready for printing, ink jet, fluorescent pen, map, thermal transfer documents, etc., respectively.

Figure 14:
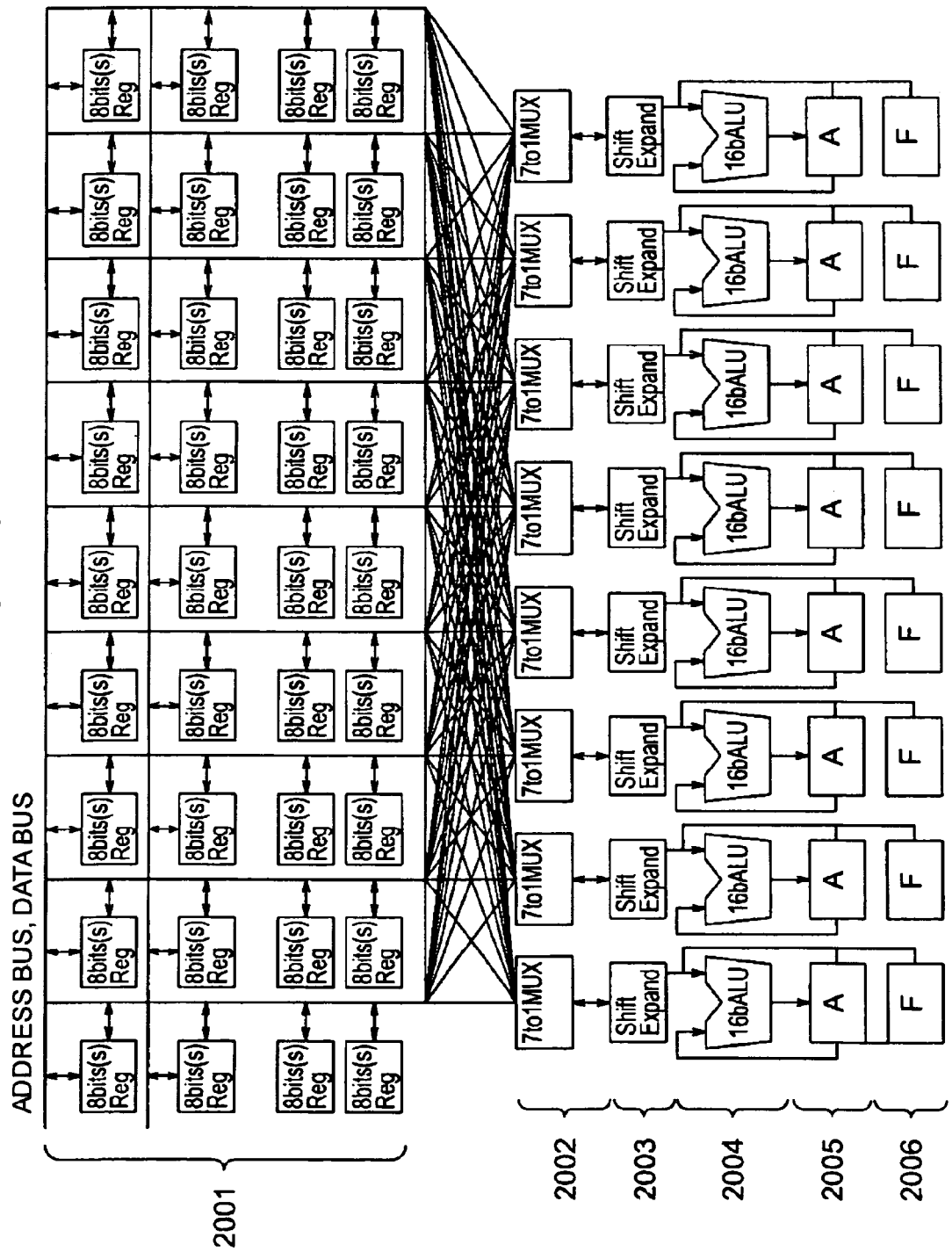
FIG. 14 is an SIMD type processor.

The gradation processing 410 is carried out by the SIMD type processor. FIG. 14 is an illustration to explain a general configuration of the SIMD type processor. SIMD (Single Instruction Stream Multiple Data Stream) is intended to execute a single command in parallel for multiple data, and comprises multiple PEs (processor elements). This SIMD type processor is disposed in the processor array unit 1404 in FIG. 17. Each PE comprises a register (Reg) 2001 for storing the data, multiplexer (MUX) 2002 for gaining access to registers of other PEs, barrel shifter (shift expand) 2003, logic unit (ALU) 2004, accumulator for storing logic results (A) 2005, and temporary register (F) 2006 for allowing the accumulator content to temporarily evacuate.

Each register 2001 is connected to an address bus and data bus (lead wire and word wire) and stores the command code for defining processing and data for processing. The content of the register 2001 is entered in the logic operator 2004 and the operation processing results are stored in the accumulator 2005. In order to export the results to the PE outside, the operation results are temporarily saved to the temporary register 2006. By exporting the content of temporary register 2006, the processing results for the target data are obtained. By giving the command code to each PE in the same content, giving the data to be processed in the varying states in accord with PEs, and referring to the content of the register 2001 of adjacent PEs in the multiplexer 2002, operation results are processed in parallel and output to each accumulator 2005. For example, if the content of image data 1 line is arranged to PE in accord with each pixel and arithmetic is performed by the same command code, the processing results of one line can be obtained in a shorter time by sequentially processing pixel by pixel. In particular, in the space filter processing, the command code for each PE is the operation equation itself and processing can be implemented for all PEs in common.

Figure 15:
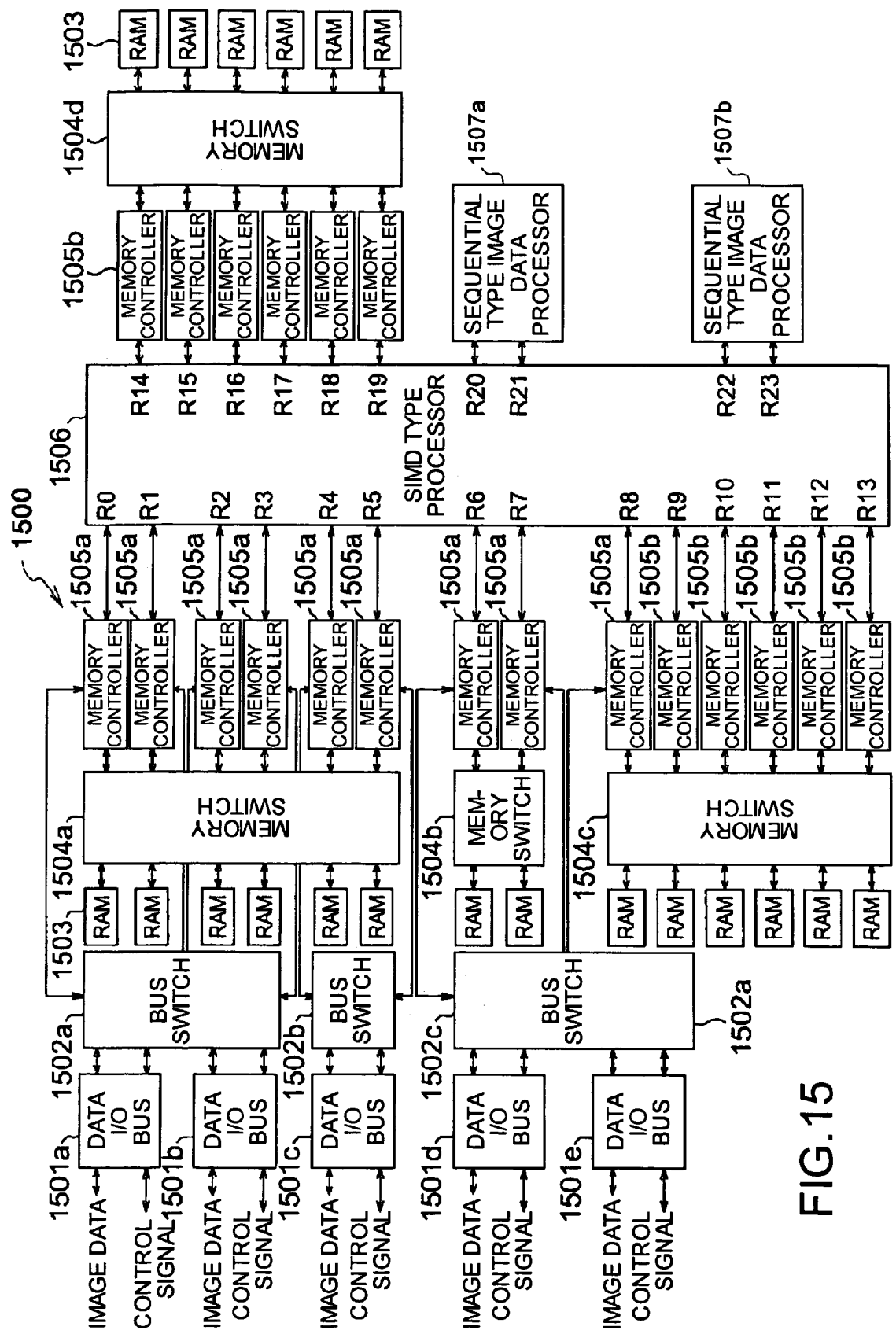
FIG. 15 is an illustration describing configurations of an SIMD type image data processor and a sequential image data processor.

Next explanation will be given of the SIMD type image data processor and sequential image data processor of the image processing system. FIG. 15 is an illustration describing configurations f SIMD type image data processor 1500 and sequential image data processor 1507. In the present embodiment, the SIMD type image data processor 1500 will be first described and the sequential type image data processor 1507 will be described later.

Figure 16:
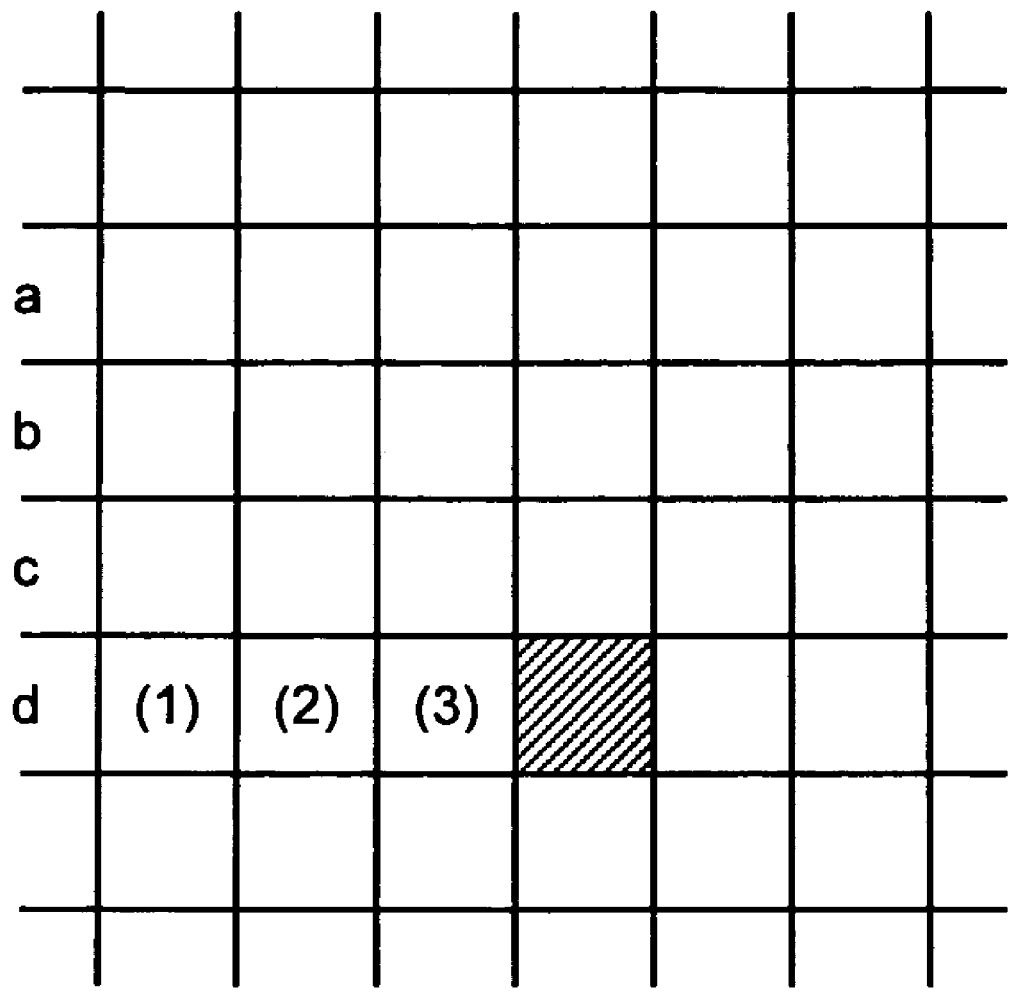
FIG. 16 is a diagram explaining the pixel line.

The parallel image data processor 1500 and sequential image data processor 1507 process the image as a plurality of pixel lines composed with a plurality of pixels arranged in one direction. FIG. 16 is a diagram explaining the pixel line and indicates four pixel lines of pixel lines (a) to (d). In addition, the pixel shown with oblique lines is the target pixel which is processed this time. In the present embodiment, in error diffusion processing of the target pixel, effects of surrounding pixels on the target pixel are considered for both pixels contained in the same pixel line and pixels contained in different pixel line. And error diffusion processing with the pixels contained in the pixel line different from the target pixel is carried out at the SIMD type image data processor 1500 and the error diffusion processing with the pixels contained in the pixel line same as the target pixel (pixels shown with reference numbers [1], [2], [3] attached in the drawing) is carried out by the sequential type image data processor 1507.

The SIMD type image data processor 1500 comprises a SIMD type processor 1506, five data I/O buses 1501a to 1501e for inputting image data and control signals to the SIMD type image data processor 1500, bus switches 1502a, 1502b, and 1502c which change over image data and control signal entered into the SIMD type processor 1506 by switching data I/O busses 1501a to 1501e as well as change over bus width of the buses connected, 20 pieces of RAM 1503 for storing data used for processing the input image data, memory controller 1505a and memory controller 1505b for controlling each corresponding RAM 1503, and four memory switches 1504a, 1504b, 1504c, and 1504d for switching RAM 1503 in response to the control of memory controller 1505a or memory controller 1505b. By the way, in the above configuration, the memory controllers are distinguished from each other by designating the memory controller to be controlled by bus switches 1502a to 1502c as memory controller 1505b and the memory controller which is not subject to control of bus switches 1502a to 1502c as memory controller 1505a.

The SIMD type processor 1506 is equipped with register 0 (R0) to register 23 (R23). Each of R0 to R23 functions as a data interface between PE located in SIMD type processor 1506 and memory controllers 1505a, 1505b. The bus switch 1502a switches the memory controller 1505b connected to R0 to R3 and enters control signals to the SIMD type processor. In addition, the bus switch 1502b switches the memory controller 1505 connected to R4, R5 and enters control signals to the SIMD type processor. In addition, the bus switch 1502c switches the memory controller 1505 connected to R6 to R9 and enters control signals to the SIMD type processor. And the bus switch 1502c switches memory controller 1505b connected to R6 to R9 to enter control signals to the SIMD type processor. In addition, the bus switch 1502c switches the memory controller 1505b connected to R6 to R9 and enters control signals to the SIMD type processor.

The memory switch 1504a transfers image data to and from PE inside the SIMD type processor 1506 and RAM 1503 using the memory controller 1505b connected to R0 to R5. In addition, the memory switch 1504b transfers image data to and from PE inside the SIMD type processor 1506 and RAM 1503 using the memory controller 1505b connected to R6 and R7. Furthermore, the memory switch 1504c transfers image data to and from PE inside the SIMD type processor 1506 and RAM 1503 using the memory controller 1505a or memory controller 1505b connected to R8 to R13. And memory switch 1504d transfers image data to and from PE inside the SIMD type processor 1506 and RAM 1503 using the memory controller 1505a or memory controller 1505b connected to R14 to R19.

An image data control unit not illustrated enters control signals for processing image data with the image data into bus switches 1502a to 1502c via data I/O buses 1501a to 1501e. Bus switches 1502a to 1502c change over the bus width of the bus connected in compliance with the control signals. In addition, the image data control unit controls the memory controller 1505b indirectly or directly connected and operates memory switches 1504a to 1504c in such a manner that the data necessary for processing the image data is exported from RAM 1503.

The SIMD type image data processor 1500 enters the image data prepared by a read-out unit and a sensor board unit not illustrated via the image data control unit when error diffusion processing is carried out. And the image data processor 1500 adds the error data which is a difference between the pixel data of the pixel contained in the pixel line (previous pixel line) processed before the pixel line (current pixel line) in which the target pixel is contained as well as the pixel data of the target pixel.

At the SIMD type image data processor 1500, using the SIMD type processor 1506, addition of the error data is carried out in parallel for a plurality of target pixels. Consequently, in any of RAM 1503 connected to the SIMD type processor 1506, a plurality of error data corresponding to the number of pixels processed in the batch at the SIMD type processor 1506 is stored. In the present embodiment, addition processing of one-pixel line is carried out in the batch at the SIMD type processor 1506 and the error data for one-pixel line is stored in RAM 1503. The added value of the image data for one pixel line and the error data processed in the batch by the SIMD type processor 1506 is output one by one from at least two out of R20, R21, R23, R22 to the sequential type image data processor 1507. In addition, the error data used for the above processing is computed by the sequential type image data processor 1507 later described and entered into the SIMD type processor 1506.

On the other hand, sequential type image data processors 1507a, 1507b are hardware which is operated not by the computer programmed control. In the structure shown in FIG. 15, two sequential type image data processors 1507 are connected to the SIMD type processor 1506, but in the image processing system related to the present embodiment, one of the two is used exclusively for error diffusion processing which is carried out sequentially, and the other sequential type image data processor 1507 has its functions specialized to be used for table conversion such as γ-conversion, etc.

Now explanation is given on the hardware configuration of the image processor.

Figure 17:
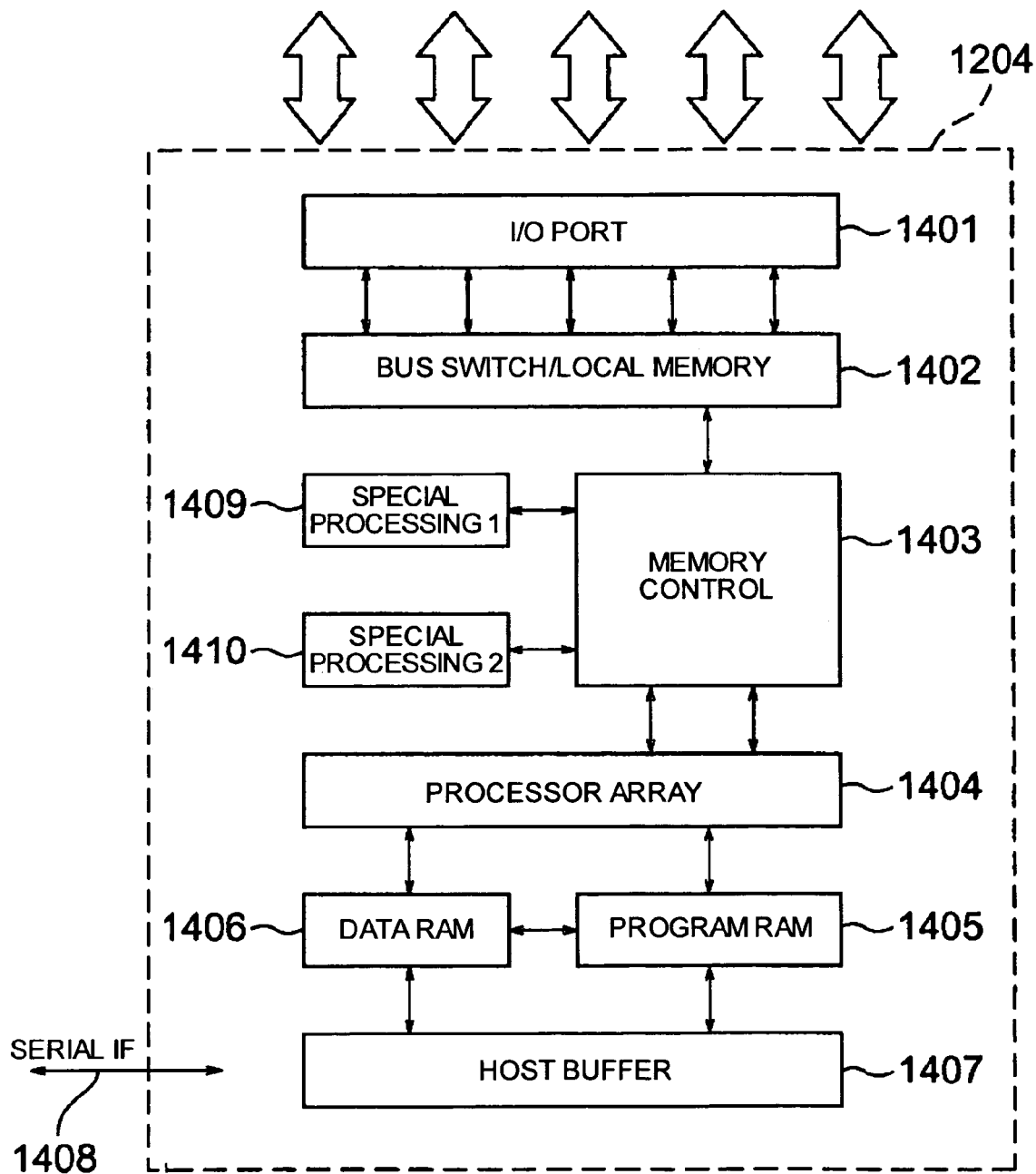
FIG. 17 is a block diagram of an image processor.

FIG. 17 is a block diagram to explain an inner configuration of image processor 1204. In the same figure, the image processor 1204 is equipped with plural pieces of I/O ports for data input and output to and from the outside, and the relevant data inputs and outputs can be optionally set. In addition, the image processor 1204 is equipped with a bus switch/local memory group 1402 inside to connect to the I/O ports 1401 and the memory areas and data bus routes used are controlled by the memory control unit 1403. The data input and the data for output have the bus switch/local memory group 1402 assigned as buffer memory, are stored, relatively, and have I/F with the outside controlled. For the image data stored in the bus switch/local memory group 1402, various kinds of processing are carried out at the processor array unit 1404 and the output results (image data processed) is stored in the bus switch/local memory group 1402 again. The processing procedures in the processor array unit 1404 and parameters, etc. for processing are transferred between program RAM 1405 and data RAM 1406.

The contents of program RAM 1405 and data RAM 1406 are downloaded from a process controller not illustrated to host buffer 1407 via serial I/F 1408. In addition, the process controller reads the content of data RAM 1406 and monitors the progress of processing. If the content of processing is changed or the processing form required for the system is changed, the content of program RAM 1405 and data RAM 1406 which the processor array 1404 refers to is updated and supported. By the way, in special processing 1 (1409), conversion processing such as table conversion, γ-conversion, etc. are primarily carried out, while in special processing 2 (1410), error diffusion processing is carried out. Of the configurations described above, the processor array 1404 corresponds to the SIMD type image data processor and sequential image data processor related to the present embodiment.

Figure 18:
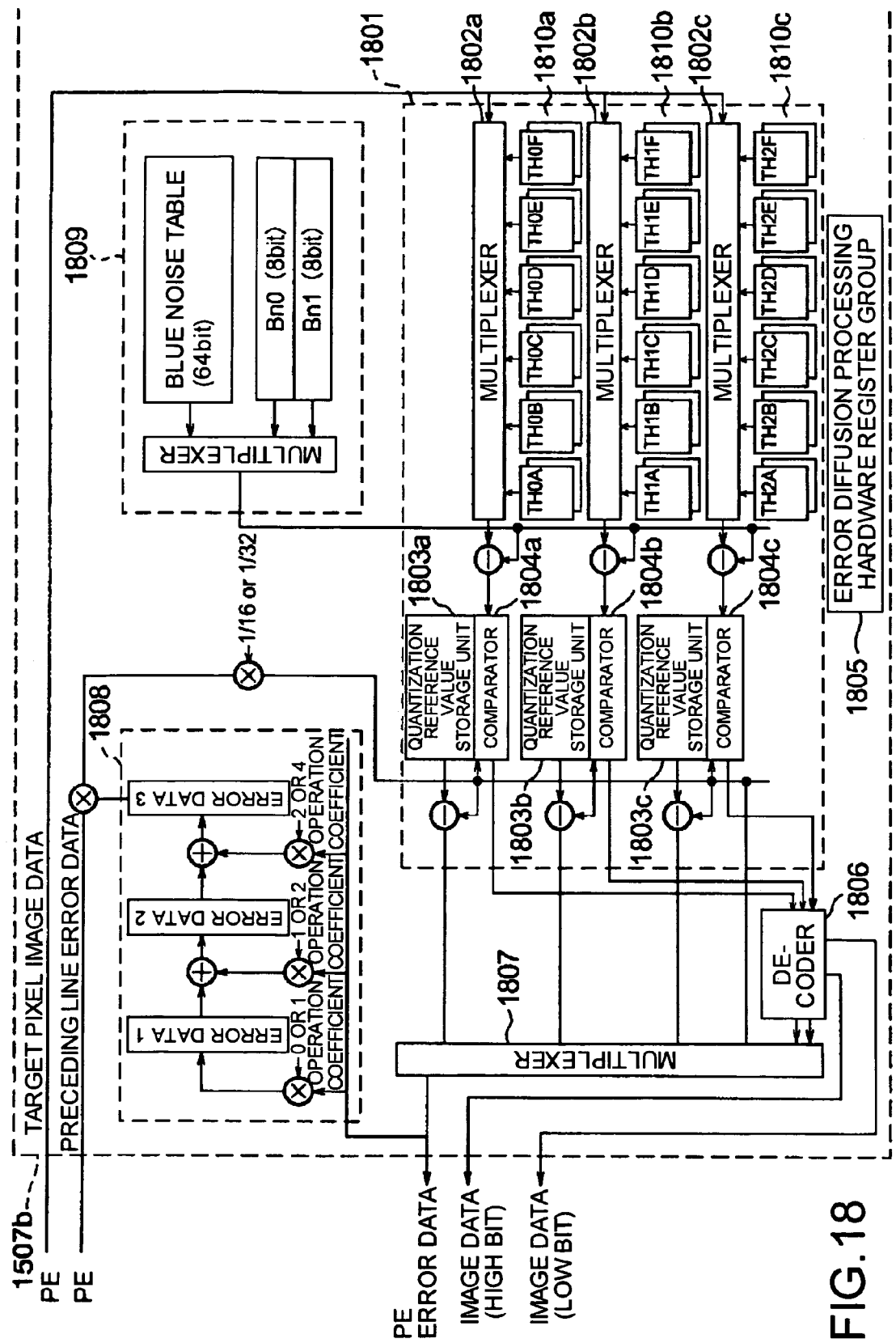
FIG. 18 is a block diagram of a sequential type image data processor.

FIG. 18 is a block diagram to explain a configuration of the sequential type image data processor 1507*b*. The illustrated sequential type image data processor 1507*b* comprises an error data computing unit 1801, a multiplexer 1807 which selects one from the error data computed by the error data computing unit 1 801, and an error data adder 1808 for processing and adding the error data selected by the multiplexer 1807 to the data entered from the SIMD type image data processor 1500. In addition, the sequential type image data processor 1507*b* is equipped with a decoder 1806 for inputting signals necessary for selecting error data in the multiplexer 1807 and an error diffusion processing hardware register group 1805 which can execute error diffusion by any of the preset error diffusion modes (binary error diffusion, ternary error diffusion, quaternary error diffusion) or sets the operation coefficient used for error diffusion processing for the sequential type image data processor 1500. Furthermore, the sequential type image data processor 1507*b* is equipped with a blue noise signal generator 1809 and even whether blue noise is used or not for error diffusion processing is configured to be selectable by setting the error diffusion processing hardware register group 1805.

The error data computing unit 1801 is configured to compute the error data which is a difference between the data of pixel contained in the current pixel line and the specified threshold value. The error data computing means 1801 is equipped with threshold value table groups 1810*a*, 1810*b*, 1810*c* connected to three quantization reference value storage units 1803*a*, 1803*b*, 1803*c*, three comparators 1804*a*, 1804*b*, 1804*c*, and three multiplexers 1802*a*, 1802*b*, 1802*c*, respectively. The threshold value table group 1810*a*, 1810*b*, 1810*c* comprise, for example, six threshold value tables THxA to THxF (x=0, 1, 2), respectively. This can be selectable by setting of error diffusion processing hardware register group 1805, and for the gradation processing in the present embodiment, two image processors, namely, an image processor used for gradation-processing of magenta and cyan image data and an image processor for gradation-processing of yellow and black image data, are used. Referring now to the magenta and cyan image data processing image processor, this processing will be described in detail as follows.

For magenta, THxA, THxB, THxC (x=0, 1, 2) are used and for cyan, THxD, THxE, THxF (x=0, 1, 2) are used. The THxA to THXC (x=0, 1, 2) used for magenta is able to allow any threshold table to be chosen, respectively, in accordance with the extraction results by the characteristic volume of image such as text, photograph, intermediate, etc. In the text unit, it is possible to carry out simple error diffusion with a fixed threshold value set without using any fast-scanning or slow-scanning position, error diffusion with dither threshold value with low number of lines for the photograph unit, and error diffusion with threshold value with high number of lines set from the photograph unit in the intermediate unit, and more preferable images can be formed. TH0A, TH1A, TH2A are threshold values for the pixel judged to have the same characteristic value. The same principle is applied to Cyan. In addition, for the processor which processes yellow and black image data, magenta should be read as yellow and cyan as black in the above explanation.

In the present embodiment, quantization reference value storage unit 1803*a*, comparator 1804*a*, and multiplexer 1802*a* connected to the threshold value table group 1810*a* operate in a team. In addition, quantization reference value storage unit 1803*b*, comparator 1804*b*, and multiplexer 1802*b* connected to the threshold value table group 1810*b* operate in a team, and quantization reference value storage unit 1803*c*, comparator 1804*c*, and multiplexer 1802*c* connected to the threshold value table group 1810*c* operate in a team.

To the sequential type image data processor 1507, the added value (added value data) of image data and error data is input from the SIMD type processor 1506. This image data is the image data of the target pixel to be processed for this time, and the error data is the error data of the pixel processed before the target pixel. The entered added value data has a value which the error data adder 1808 computed on the basis of the error data of the pixel processed before added and divided by 16 or 32 for reducing the operation errors. Furthermore, the added value data divided is entered into all the three comparators 1804*a* to 1804*c* of the error data computing unit 1801. By the way, the value which the error data adder 1808 computed on the basis of the error data of the pixel processed before will be described later.

To comparators 1804*a* to 1804*c*, threshold values are entered from multiplexers 1802*a* to 1802*c* connected to the threshold table group, respectively. And the threshold value is subtracted from the entered added value data, and the image data is formed. In addition, the value with the quantization reference value stored in the relevant quantization reference value storage units 1803*a* to 1803*c*, respectively, subtracted from the added value data is output to the multiplexer 1807 as the error data. As a result, to the multiplexer 1807, a total of three error data are simultaneously entered.

By the way, when the blue noise is used for error diffusion processing, the blue noise signal generator 1809 turns on and off the blue noise data at a comparatively high frequency and generates the blue noise. The threshold value is subtracted from the blue noise before it is entered into comparators 1804*a* to 1804*c*. By the processing using the blue noise, suitable variations are provided to the threshold value and the occurrence of peculiar texture to the image can be thereby prevented.

In the threshold value tables 1802*a* to 1802*c*, varying threshold values are stored, respectively. In the present embodiment, of the threshold value tables 1802*a* to 1802*c*, it is designed for the largest threshold value to be stored in the threshold value table 1802*a*, then, for the next largest threshold values to be stored in the threshold value table 1802*b*, which is followed by the threshold value table 1802*c* in that order. In addition, to the quantization reference value storage units 1804*a* to 1804*c*, the quantization reference values stored in accordance with the connected threshold value tables 1802*a* to 1802*c* are set. For example, when the image data is expressed by a 256-value from 0 to 255, in the quantization reference value storage unit 1803*a*, 255 is stored, in the quantization reference value storage unit 1803*b*, 170 is stored, and in the quantization reference value storage unit 1803*c*, 85 is stored.

Comparators 1804*a* to 1804*c* output the prepared image data to logic circuit 1806. The logic circuit 1806 chooses the image data of the target pixel from this and enters in the multiplexer 1807. The multiplexer 1807 chooses any of the three error data as the error data of the target pixel in accordance with the entered image data. The chosen error data is entered into any of RAM 1503 via PE of SIMD type processor 1506. Furthermore, the image data which the logic circuit (decoder) 1806 output is branched before it is entered into the multiplexer 1807 and entered into any of PE of SIMD type processor 1506. In the present embodiment, the image data is designed to be the data expressed by high 2 bits and low 2 bits. Consequently, in this processing, no comparator 1804*a* is used. By the way, in the present embodiment, the image data of the target pixel is hereinafter called the pixel data.

The error data chosen is entered into the error data adder 1808. The error data adder 1808 stores pixels shown with reference numerals [1]. [2]. and [3] designated in FIG. 16, that is, error data of the pixel processed three lines before with respect to the target pixel (denotes error data 3 in FIG. 18), error data of the pixel processed two lines before (denotes error data 2 in FIG. 18), and error data of the pixel processed one line before (denotes error data 1 in FIG. 18).

The error data adder 1808 multiplies the error data 3 by 0 or 1, which is the operation coefficient. In addition, the adder 1808 multiplies the error data 2 by 1 or 2, which is the operation coefficient, and multiplies the error data 1 by 2 or 4 which is the operation coefficient. And the adder 1808 adds three multiplied values and then, adds this value (weighted error data) to the added value data entered next from the SIMD type processor 1506. As a result, the pixel located closer to the target pixel exerts greater effect on the error diffusion processing of the target pixel, and the error of the pixel can be properly diffused, and an image close to the original image can be formed.

Figure 19:
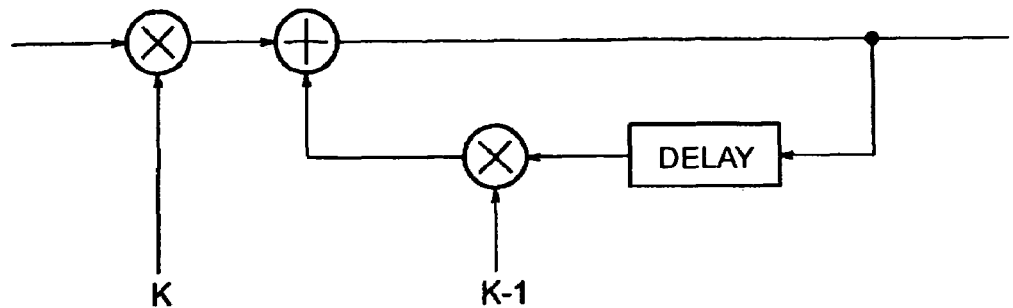
FIG. 19 is a IIR type filter system.

The preparation of the image data in the sequential type image data processor 1507 as described above is carried out by the use of a configuration generally called the IIR type filter system. FIG. 19 shows the system configuration. The operation formula used in the IIR type filter system is expressed as follows:

$$ODn = (1-K) \times ODn-1 + K \cdot IDn \quad (3)$$

where, ODn: pixel density after operation

ODn−1: operation results using the pixel data one line before.

IDn: current pixel data

K: weighting factor

As clear from equation 3 and FIG. 19, the density ODn after operation can be found from the operation result ODn−1 using the pixel data one line before and the value of current pixel data IDn. In general, the IIR type filter system is a circuit specialized for doing arithmetic for the current pixel by the use of the operation results with the pixel processed before the current pixel used, that is, a circuit for carrying out so-called sequential conversion. The sequential type image data processor 507 of the image processing system related to the present embodiment can be used for the sequential conversion in common as shown in FIG. 19 without using the processing shown in FIG. 20 later described.

Figure 21:
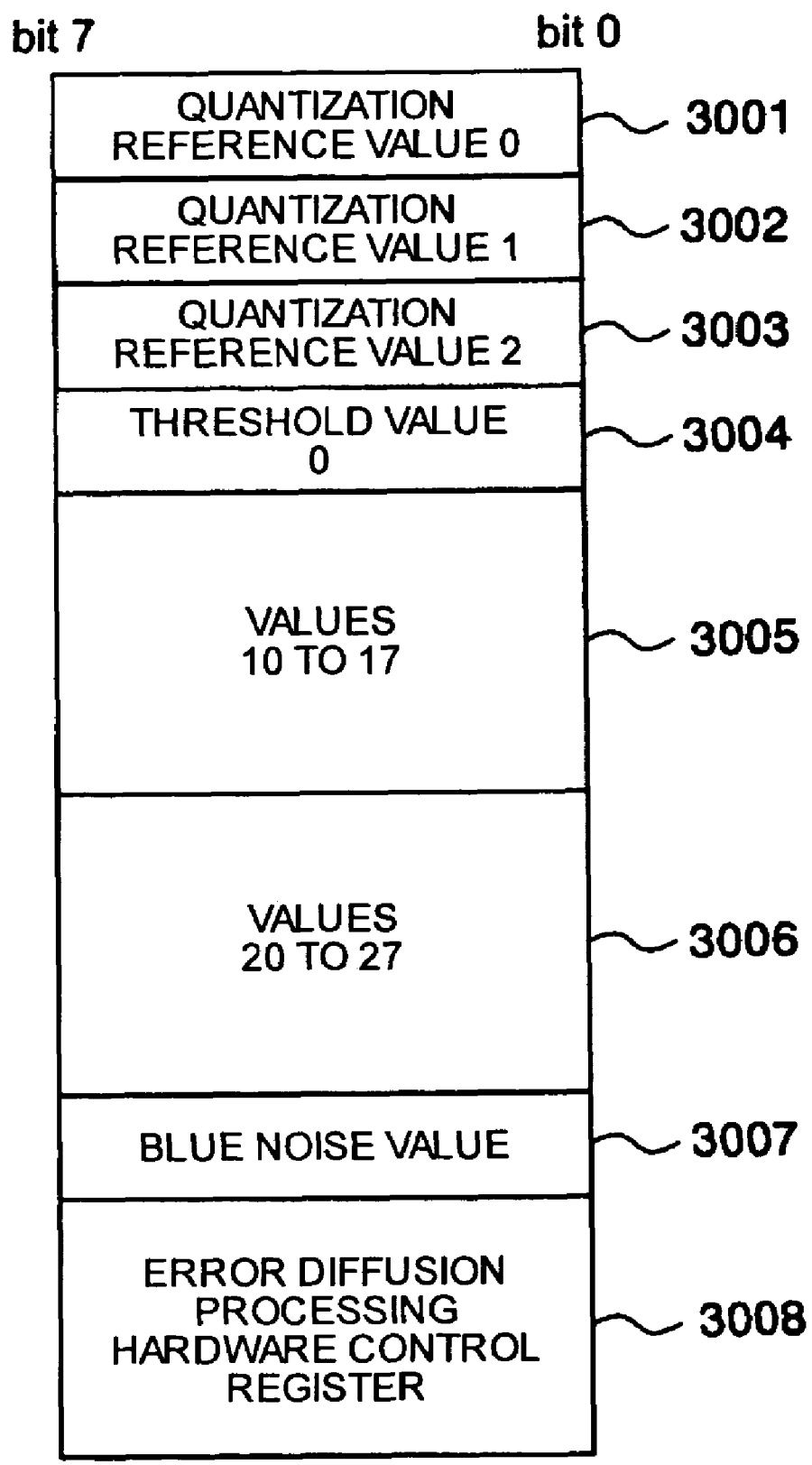
FIG. 21 is an illustration describing a register installed to an error diffusion processing hardware register group.

FIG. 21 is an illustration describing a register to be installed to the error diffusion processing hardware register group 1805. The image processing system related to the present embodiment can choose in which of the following the error diffusion processing is carried out by setting the registers illustrated:

Mode to carry out error diffusion processing by binary error diffusion (binary error diffusion mode), Mode to carry out error diffusion processing by tertiary error diffusion (tertiary error diffusion mode), and Mode to carry out error diffusion processing by quaternary error diffusion (quaternary error diffusion mode).

And the image processing system can set the operation coefficient used for the error data adder 1808, too. Furthermore, it is also possible to choose whether or not the blue noise is used for error diffusion processing.

The error diffusion processing hardware register group 1805 shown in FIG. 21 comprises a register 3001 for setting quantization reference value 0 of the quantization reference value storage unit 1803*a*, a register 3002 for setting quantization reference value 1 of the quantization reference value storage unit 1803*b*, and a register 3003 for setting quantization reference value 2 of the quantization reference value storage unit 1803*c*. In addition, the error diffusion processing hardware register group 1805 comprises register 3004 for setting threshold value 0 set to the threshold value table 1802*c*, register 3005 for setting threshold value 10-17 set to the threshold value table 1802*b*, register 3006 for setting threshold value 20-27 set to the threshold value table 1802*a*, register 3007 for setting the blue noise value, and an error diffusion processing hardware control register 3008. To each register, 8 bits are assigned, respectively, and the whole register has a total of 64-bit data volume.

The binary error diffusion mode sets the same value to all the registers 3001 to 3003. And the binary error diffusion mode can be achieved by setting FFH to register 3004 and register 3005. And the tertiary error diffusion mode has the same value set to register 3001 and register 3002 and FFH to register 3004. Furthermore, in the binary error diffusion mode and tertiary error diffusion mode, it is possible to change over fixed threshold value error diffusion processing and variable threshold value error diffusion processing by setting the same value to register 3005 and register 3006 or different value to register 3005 and register 3006.

When the blue noise is used for error diffusion processing, a value that indicates to use the blue noise is set to register 3007. And a switching data that indicates on-off of blue noise data is set to register 3005. When the switching data is 1, the blue noise value is added to each threshold value and when the switching data is 0, the threshold value is used as it is. Furthermore, the operation coefficient used for the error data adder 1808 can be chosen by changing the setting of the error diffusion processing hardware control register.

Figure 22:
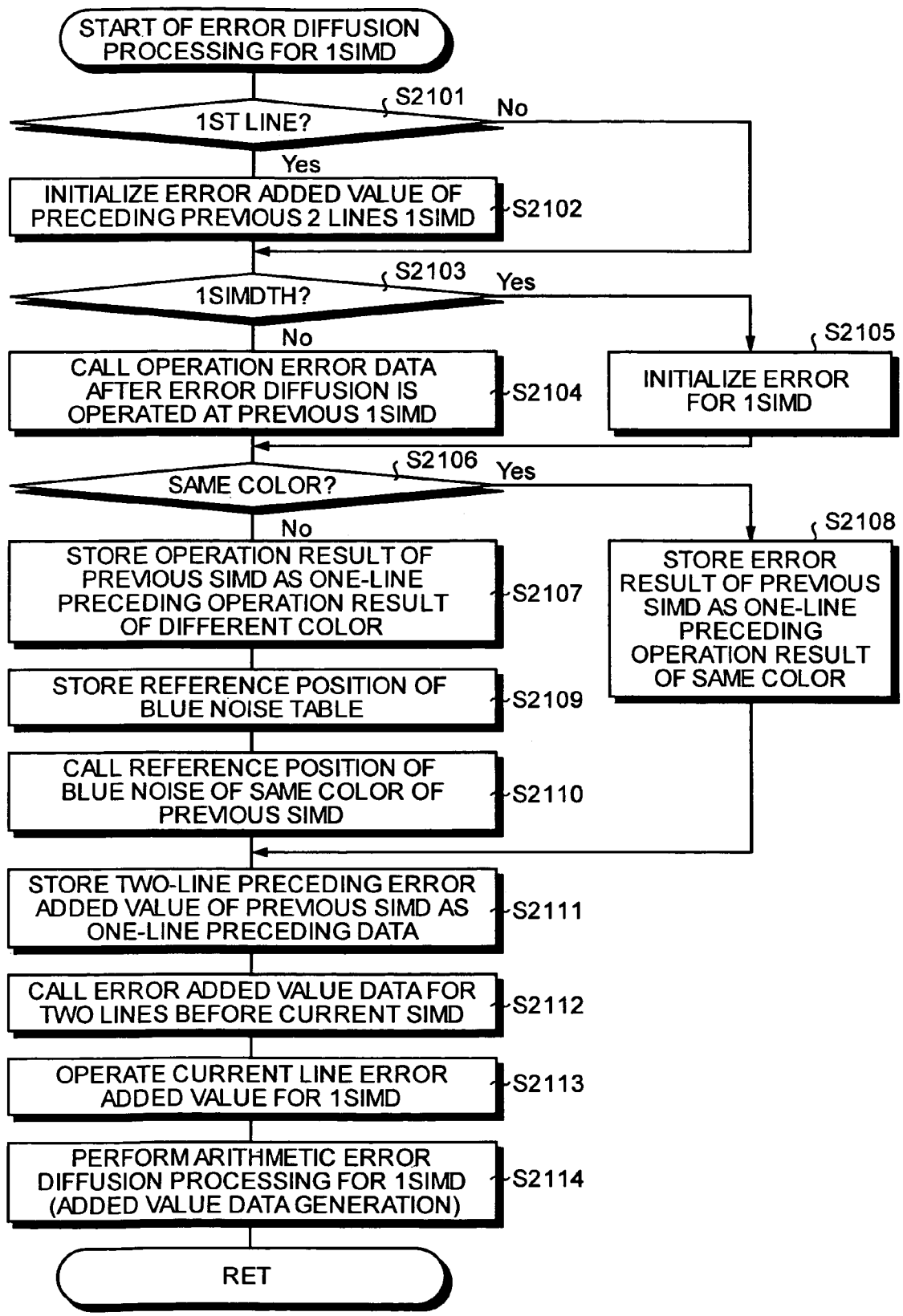
FIG. 22 is a flow chart to explain the error diffusion processing procedure which takes place in the SIMD type processor.
Figure 23:
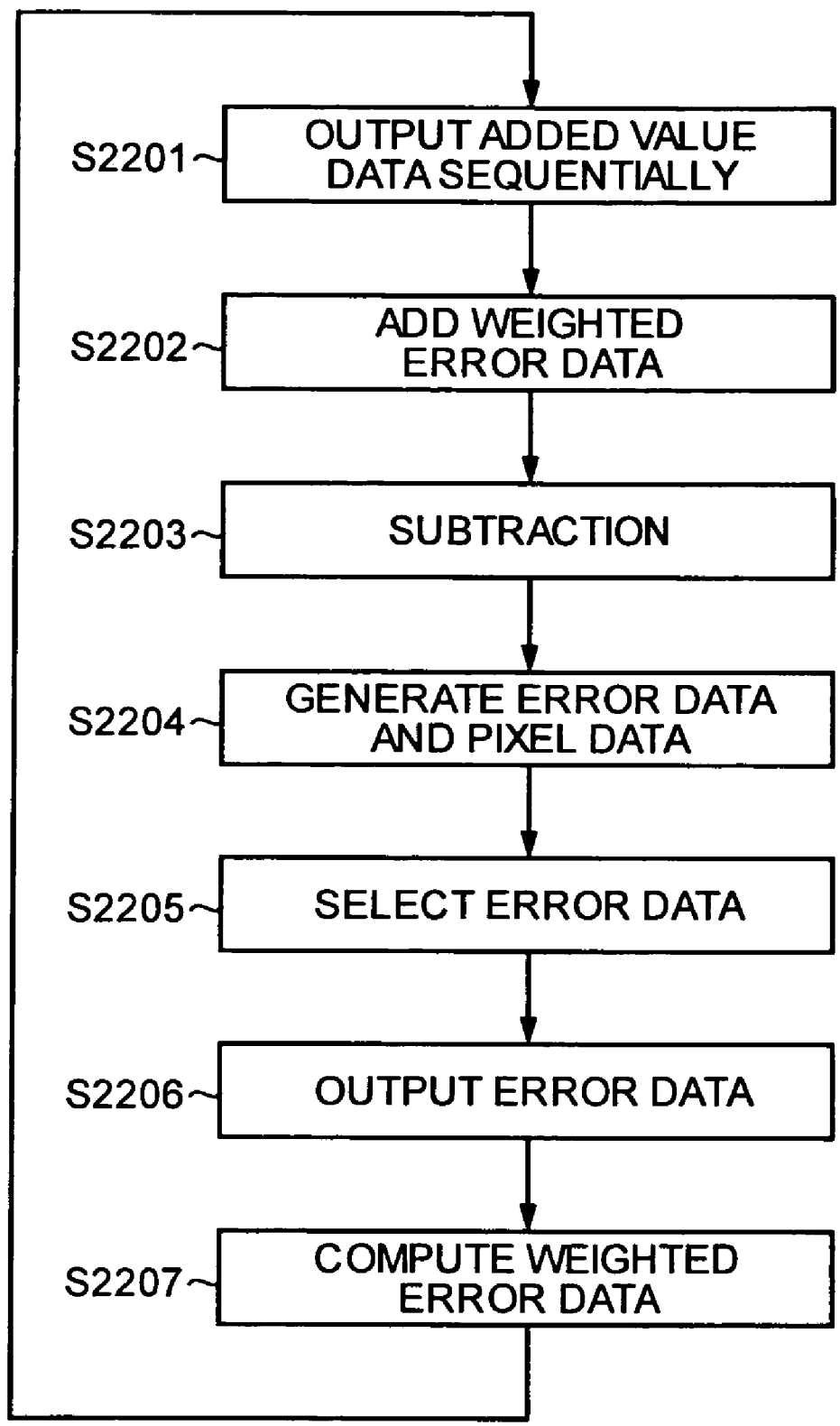
FIG. 23 is an illustration to explain the error diffusion processing procedure which takes place in the sequential type image data processor.

Referring now to the drawings of a flow chart and the processing procedure, explanation will be made on the processing which is carried out at the SIMD type processor 1506 and sequential type image data processor 1507*b*. FIG. 22 is a flow chart to explain the error diffusion processing procedure which is carried out at the SIMD type processor 1506, FIG. 23 is an illustration to explain the error diffusion processing procedure which is carried out in the sequential type image data processor 1507b, and FIG. 24 is an illustration to explain line shift.

In the structure shown in FIG. 22, first of all, the SIMD type processor 1506 judges whether the current image data is the first line or not (S2101), and if it is the first line, the error added values of the previous 2 lines are initialized (S2102). Then, whether the image data to be error-diffusion-operated this time is the 1SIMDth or not is judged (S2103), and if it is the 1SIMth (image data at the head end of the present line), the error added value is initialized (S2105). If it is not the 1SIMDth, it is judged whether the error data after the error diffusion is operated at the previous SIMD has the same color as that of the image data currently in operation (S2104, S2106), and if the color is different, the operation results of the previous SIMD is stored as the different color of the preceding line (S2107, processing A2 of FIG. 24), the reference position of the blue noise is stored, too (S2109), and the reference position of the blue noise of same color of previous error-diffusion-operated is called (S2110).

Figure 24:
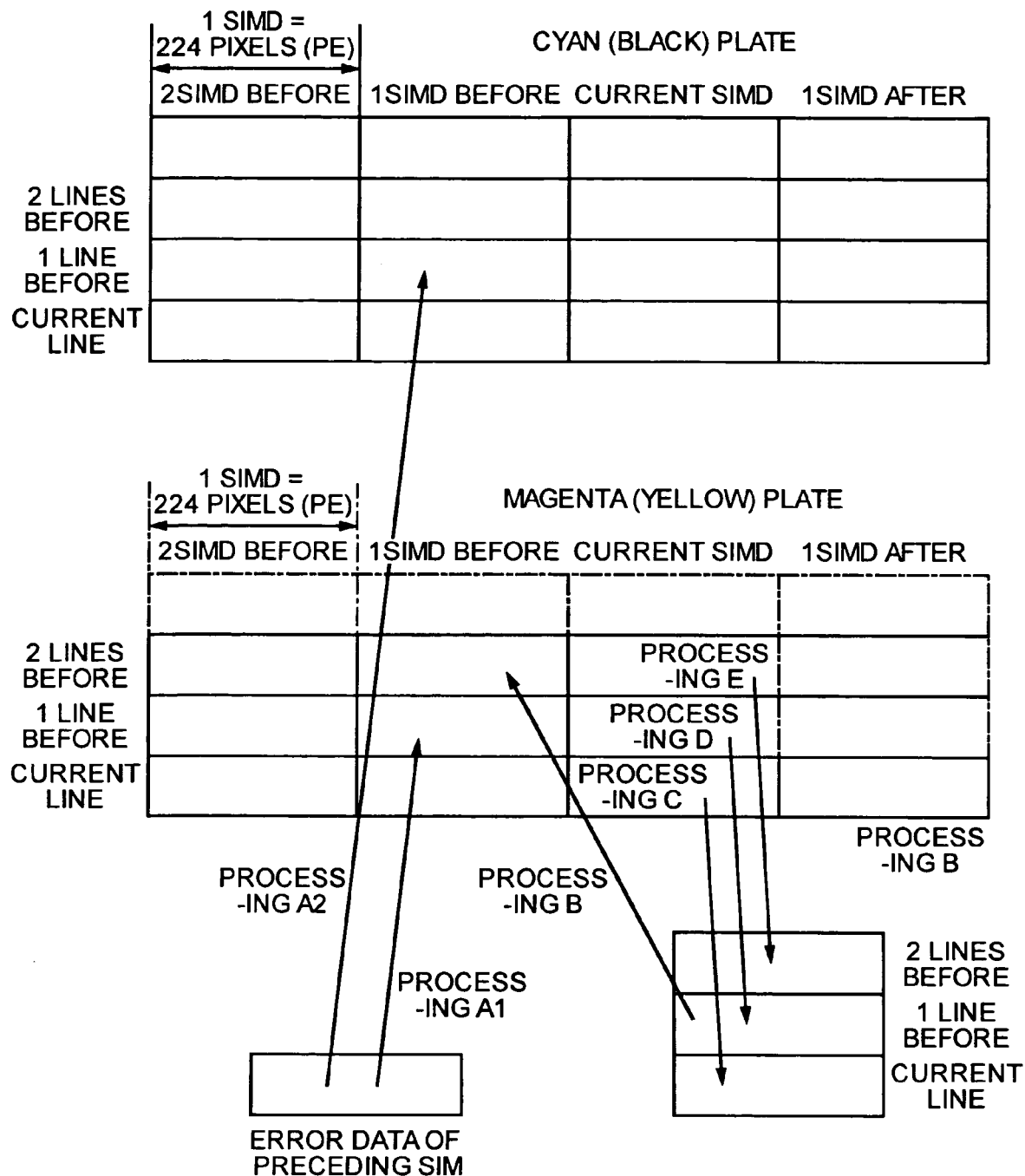
FIG. 24 is an illustration to explain line shift implemented in the processing of FIG. 22.

If the color is the same in S2106, it is stored as the operated results of previous SIMD one-line before of the same color (S2108, processing A1 of FIG. 24). Whether it is the same color or not is judged in such a manner, for example, that if the color to be error-diffusion-operated now is the image data of magenta plate, the image data of cyan plate is judged a different color, and if it is the image data of magenta plate, it is judged the same color.

And the two-line preceding error added value of previous SIMD is stored as one-line preceding data (S2111, processing B of FIG. 24), and the data of 2 lines before of the current SIMD is called out from the memory (S2112, processing D, E of FIG. 24). Then, after calling out the current SIMD data from the current line (processing C of FIG. 24), the error added value is operated (S2113). Then, arithmetic of error diffusion processing is performed by the sequential type image data processor 1507b (S2114).

On the other hand, the sequential type image data processor 1507 enters the added value data which the SIMD type processor 1506 outputs in step S2102 as shown in FIG. 23 (Step S2201). And to the entered added value data, the weighted error data is added generated in the error data adder 1808 (Step S2202). The added value data with the weighted error data added is divided by 16 or 32 (Step S2203), and entered into the error data computing unit 1801. The error data computing unit 1801 generates the error data and pixel data in compliance with the data entered (Step S2204), and enters the error data into the multiplexer 1807. In addition, the error data computing unit enters the pixel data into the logic circuit 1806 and the SIMD type processor 1506.

The multiplexer 1807 chooses one of the error data in compliance with the image data entered from the logic circuit 1806 (Step S2205). And the multiplexer 1808 outputs the chosen error data to the SIMD type processor 1506 and the error data adder 1808 (Step S2206). The error data adder 1808 with the error data entered computes the weighted error data on the basis of the error data (Step S2207). The sequential type image data processor 1507 repeatedly executes the above processing sequentially to the added value data to be entered.

Figure 20:
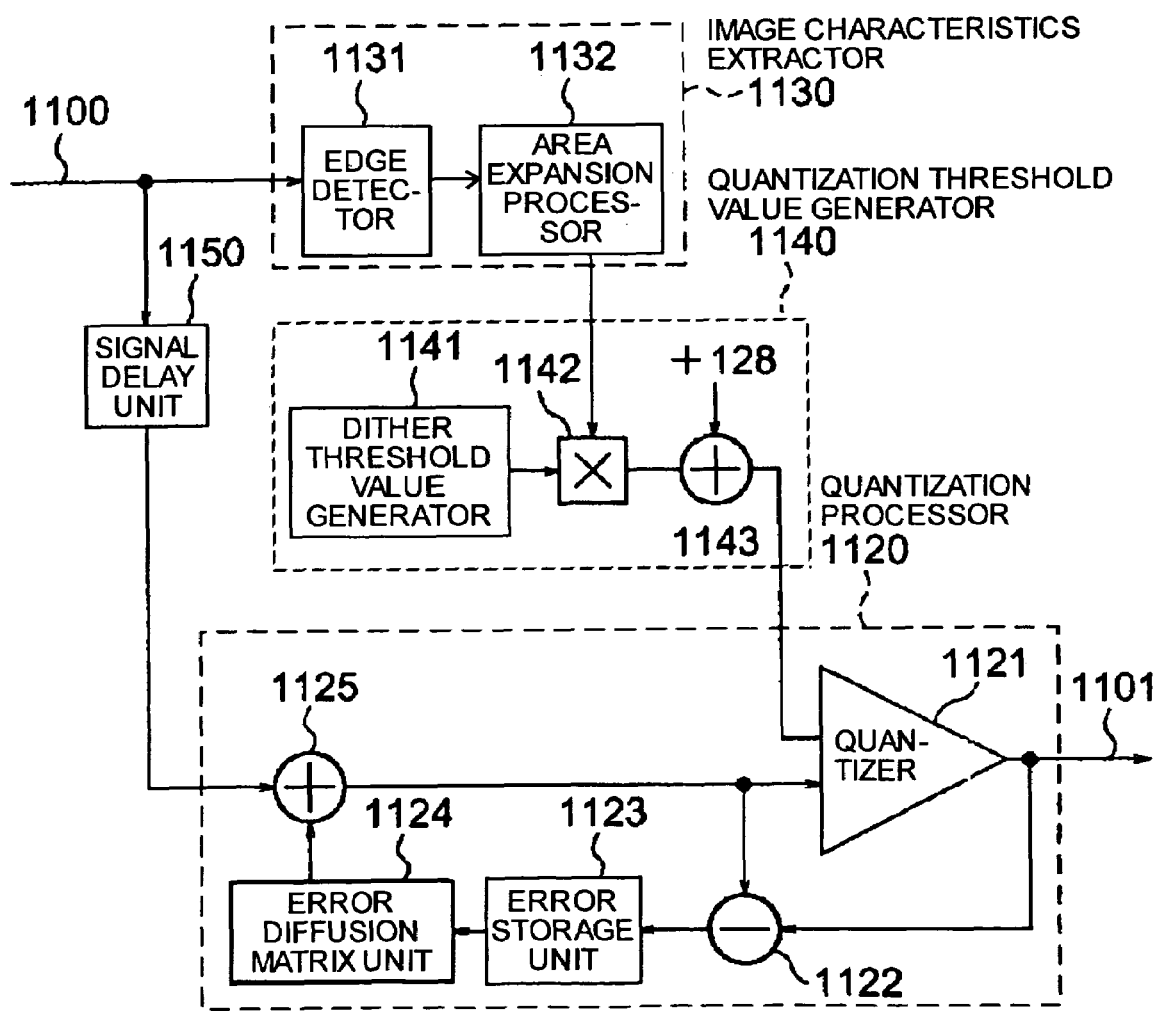
FIG. 20 is a block diagram of an image processor.

FIG. 20 is a block diagram to explain a configuration of an image processor, and referring now to FIG. 20, the image processing system will be explained.

The image processor receives the multigradation image data 1100 and outputs the quantization data 1101, and comprises a quantization processor 1120, image feature extractor 1130, quantization threshold value generator 1140, and signal delay unit 1150 for adjusting timing between the quantization processor 1120 and the image feature extractor 1130. This signal delay unit 1150 is installed as required, and comprises, for example, a required number of lines of line memory. The entered image data 1100 is a 8-bit/1-pixel data which is read at 600 dpi by, for example, a scanner. In general, this kind of image data 1100 is entered after allowing it to pass the smoothing filter to smoothly express the intermediate tone. In general, since it is smoothed from the image cycle of about 150 Lpi, the cyclic components of halftone images of high screen ruling of 175 Lpi or more used for gravure-printing do not remain in the image data 1100.

The quantization processor 1120 quantizes the multigradation image data by the error diffusion method using the quantization threshold value generated at the quantization threshold value generator 1140, and in the present embodiment, as illustrated, the processor comprises a quantizer (comparator) 1121, error computing unit 1122, error storage unit 1123, error diffusion matrix unit 1124, and error adder 1125. The image data 1100 has the timing adjusted by the signal delay unit 1150 and entered into the error adder 1125. The image data with the diffusion error added by the error adder 1125 is entered to the quantizer 1121. The quantizer 1121 quantizes the entered image data by the use of the quantization threshold value given by the quantization threshold value generator 1140 and the quantization results are output as the quantization data 1101.

In the present embodiment, explanation will be made by taking 2-bit error diffusion processing as an example.

At the quantization threshold value generator 1140, quantization threshold values 1 to 3 (th1 to th2) are generated. The relationship of threshold values can be expressed by:

Quantization threshold value 1 (th$\leq$1)quantization threshold value 2 (th2)$\leq$quantization threshold value 3 (th3).

In this part of the unit, it is explained that the quantizer 1121 compares the entered image data with threshold values th1 to th3, and outputs the quantization data 1101 which takes "3" if the data is greater than th3, "2" if the data is greater than th2, and "1" if the data is greater than th1, and "0" if it is smaller than th1.

The error computing unit 1122 computes a quantization error of the quantizer 1121. Because 8-bit image data is handled in this part of the unit, in this error computation, for example, "3" of the quantization data 1101 is handled as 255 (decimal system), "2" as 192 (decimal system), "1" as 128 (decimal system), and "0" as 0 (decimal system). The computed quantization error is temporarily stored in the error storage unit 1123. This error storage unit 1123 intends to store the quantization error related to the processed pixels in the vicinity of the target pixel. In the present embodiment, in order to diffuse the quantization error as described below to the peripheral pixels of 2 lines ahead, for example, a line memory of 3 lines is used for the error storage unit 1123.

The error diffusion matrix unit 1124 is intended to compute the diffused error to be added to the next target pixel from the quantization error data stored in the error storage unit 1123. In the present embodiment, the error diffusion matrix unit 1124 computes the diffused error data using the error diffusion matrix of a size of 3 pixels in the slow-scan direction and 5 pixels in the fast-scan direction as shown in FIG. 25. In the structure shown in FIG. 23, the mark asterisk (*) corresponds to the position of the target pixel, and reference letters (a), (b) . . . , (k), (l) denote coefficients corresponding to the positions of 12 processed pixels in the vicinity (total sum is 32). In the error diffusion matrix unit 1124, the value dividing the product sum of coefficients (a) to (l) corresponding to the quantization errors to these 12 processed pixels by 32 is given to the error adder 1125 as a diffusion error to the next target pixel.

The image feature extractor 1130 comprises an edge detector 1131 and an area expansion processor 1132. The edge detector 1131 is intended to detect the edge of image data 1100 and outputs the 4-bit edge data that expresses the edge levels from level 0 (maximum edge degree) to level 8 (non-edge) in the present embodiment. More specifically, using four kinds of 5×5 differential filters shown, for example, in FIG. 26, the edge detector detects the edge amount in four directions, fast-scan direction, slow-scan direction, directions slanted ±45° from the fast-scan direction, chooses the maximum edge amount in the absolute value, quantizes the absolute value of the edge amount in four edge levels from level 0 to level 3, and outputs the results.

The area expansion processor 1132 carries out 7-pixel-wide area expansion processing for the edge detected by the edge detector 1131, refers to the edge data output by the edge detector 1131, designates the minimum edge level (maximum edge degree) of the 7×7 pixel area around the target pixel (range of 3 pixels before and after in the fast-scan direction and 3 pixels before and after in the slow-scan direction) as the edge level of the target pixel, and outputs it as the 4-bit edge data. This edge data is given to the quantization threshold value generator 1140.

The quantization threshold value generator 1140 generates the quantization threshold value which periodically vibrates on the image space at the vibration amplitudes that correspond to the edge level expressed by the edge data output by the area expansion processor 1132 and provides it to quantizer 1121 of the quantization processor 1120, and comprises a dither threshold value generator 1141, a multiplier 1142 for multiplying the output value of this dither threshold value generator 1141 by the coefficients (0-3) corresponding to the edge level shown by the edge data, and an adder 1143 for adding a fixed value (128 in this embodiment) to the output value of the multiplier 1142.

Figures 27, 28, 29:
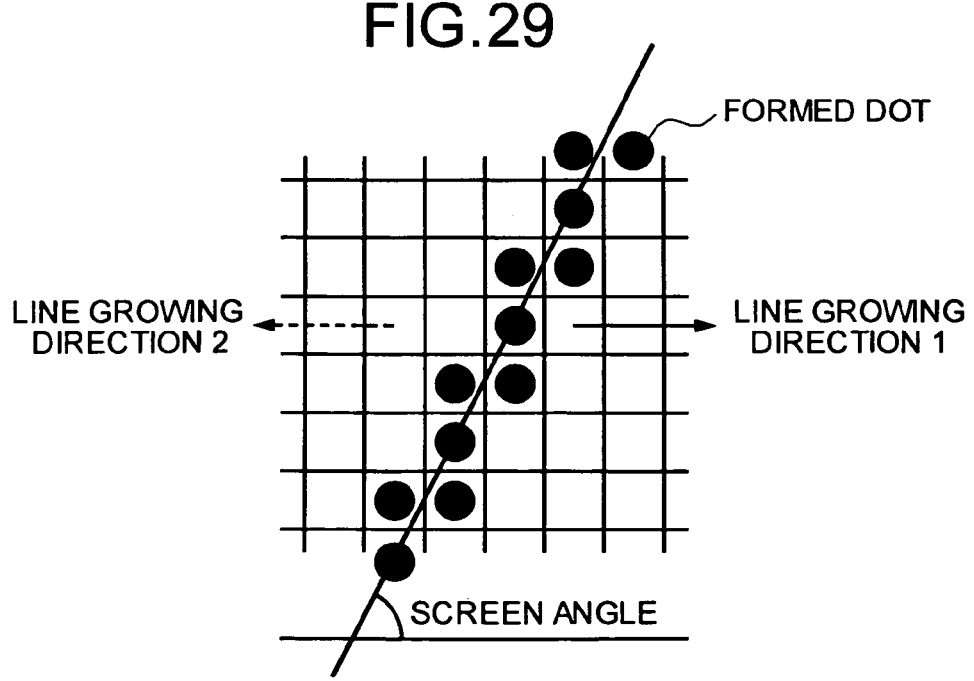
FIG. 27 shows an example of dither threshold value matrix of the dither threshold value generator.
FIG. 28 shows the other example of dither threshold value matrix of the dither threshold value generator.
FIG. 29 is an illustration to explain the screen angle and line growing direction.

In the present embodiment, the dither threshold value generator 1141 uses the 4×4 dither threshold value matrix with threshold values 1 to 6 as shown in FIG. 27 and FIG. 28 arranged in such a manner that the threshold values form a line according to size (1: minimum; 6: maximum), and outputs a dither threshold value which vibrates periodically from 1 to 6 on the image space. Now, for the pixel of the same value, the same threshold value is used. The dither threshold value cycle corresponds to 168 Lpi in the forming 600 dpi images. This kind of dither threshold value generator 1141 can be easily achieved by ROM which houses the dither threshold value matrix, counters which count fast and slow-scanning timing signals of the image and generate the read-out address of this ROM, etc. Now, the pixel which is set as 1 in FIG. 27 and FIG. 28 indicates that it forms a dot with two pixels aligned in the fast-scan direction by arranging pixels in the fast-scan direction. With a stable dot formation as described here intended, value 1 which is a writing level with little energy is arranged in two pixels. FIG. 29 shows the screen angle and line growing direction in such event. The ling growing direction is shown in the "line growing direction 1" in the drawing.

The multiplier 1142 multiplies the output value of the dither threshold value generator 1141 by coefficient 3 when the edge level shown by the edge data from the image characteristics extractor 1130 is level 0 (non-edge), coefficient 2 when the edge level is level 1, coefficient 1 when the edge level is level 2, and coefficient 0 when the edge level is 3 (maximum edge degree).

If the quantization data 1101 of the image processor configured as above is given to, for example, an electrophotographic system printer, a high-quality image can be formed, in which good resolution is obtained at points of change of texts and images, or halftone image units, etc., high smoothness and high stability are achieved for portions of photographs and images with less changes and halftone images of high screen ruling, etc., and these areas are matched without sense of discomfort. This will be described in detail as follows.

At the portions such as texts in images or edge units of line drawings where changes are steep and the edge level is level 3 (highest edge degree), the quantization threshold value generated at the quantization threshold value generator 1140 is fixed, and quantization processing by a pure error diffusion method using a fixed threshold value takes place at the quantization processor 1120, and therefore, images with good resolution can be formed.

In the present embodiment, two SIMD processor which has a sequential processor shown in FIG. 14 are used, an SIMD processor which has a one-sequential processor is used for the image data of Y (Yellow) and the image data of K (Black) with respect to the YMCK image data, and another SIMD processor which has a one-sequential processor is used for two sets of image data of C image signal M, and gradation processing is carried out. For this purpose, 2-input 2-output image data which outputs two image data (YK or CM) before gradation processing to be entered in the SIMD processor and two image data (YK or CM) from the SIMD processor is processed. When error diffusion processing is carried out, the SIMD processor which has a one-sequential processor is switched for every image data number which can be SIMD-processed for the two image data entered.

Figure 30:
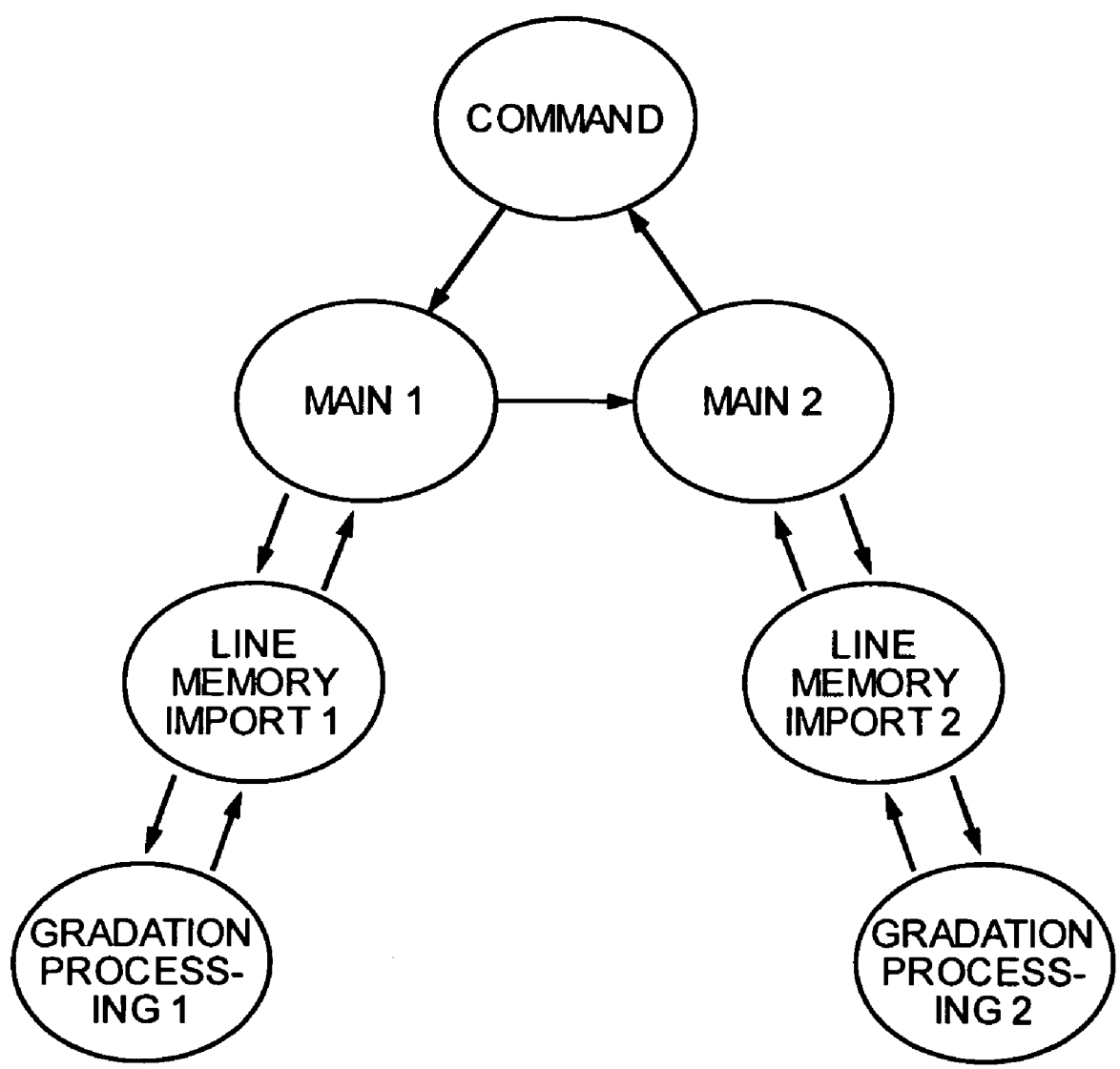
FIG. 30 is a state transition diagram of the image processor.

FIG. 30 is a state transition diagram of the image processor. As shown in the drawing, the processing condition loops like command→ main 1 (magenta/yellow image data processing)→ main 2 (cyan/black image data processing)→ command→ main 1 . . . .

Figure 31:
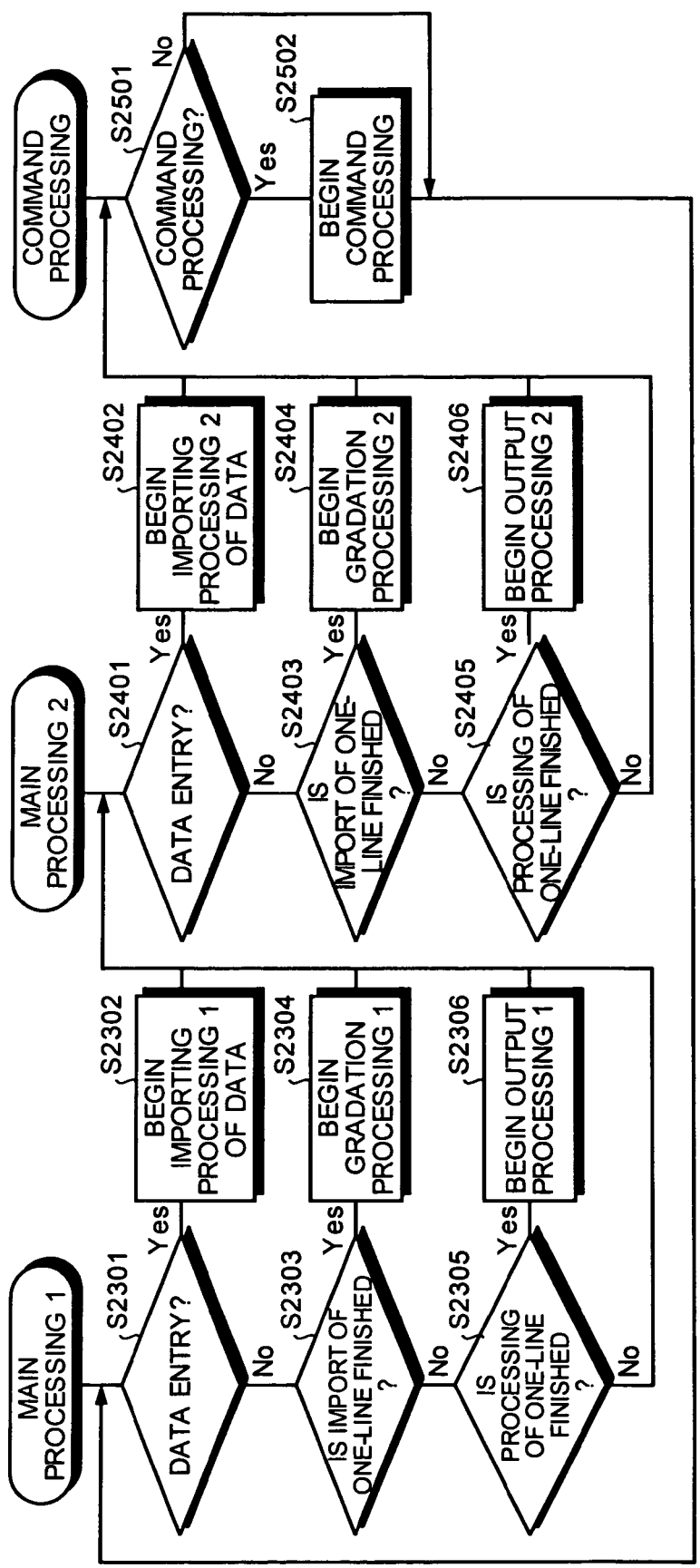
FIG. 31 is a flow chart to explain the operating procedure of an image processor with 2 inputs and 2 outputs.

Referring now to the flow chart of FIG. 31, movements of the image processor at the time of 2-input 2-output is described.

In main processing 1, processing of magenta or yellow image data is carried out, and in main processing 2, processing of cyan or black image data is carried out. For the SIMD processor 1506, the image data of magenta (yellow) is entered by the use of the data I/O bus 1501*a*, and output by the use of the data I/O bus 1501*c*. Similarly, the image data of cyan (black) is entered by the use of the data I/O bus 1501*b*, and output by the use of the data I/O bus 1501*d*. The data I/O bus 1501*c* is used for outputting for debugging.

When there is any data entry to the SIMD processor 1506 in main processing 1(S2301), the importing processing of the image data to memory 1503 begins (S2302). When import of one line is finished (S2303), gradation processing (error diffusion processing in this case) begins in units of image data which the SIMD processor 1506 can process (S2304). When processing of one line is finished (S2305), output of one line begins (S2306). In the import of image data to memory and output start processing such as S2302, S2306, etc., the SIMD processor sets the processing start command to each memory controller 1505*a* to 1505*b* to registers, and the SIMD processor moves to the next control (state transition). Gradation processing (error diffusion processing) is started (S2304) by writing a specified setting for a start processing command to the sequential processor 1507*b* which corresponds to the error diffusion processing hardware control register 2008 start command.

Similarly, in main processing 2, when there is any data entry to the SIMD processor 1506 (S2401), the importing processing of the image data to memory 1503 begins (S2402). When import of one line is finished (S2403), gradation processing (error diffusion processing in this case) begins in units of image data which the SIMD processor 1506 can process (S2404). When processing of one line is finished (S2405), output of one line begins (S2406). In the import of image data to memory and output start processing such as S2402, S2406, etc., the SIMD processor sets the processing start command to each memory controller 1505a to 1505b to registers, and the SIMD processor moves to the next control (state transition). Gradation processing (error diffusion processing) is started (S2404) by writing a specified setting for a start processing command to the sequential processor 1507b which corresponds to the error diffusion processing hardware control register 2008 start command.

In the command processing, command reception processing is carried out from the control CPU to the SIMD processor 1506 (S2501, S2502).

For the dither processing, it is possible to choose dither processing of any optional size from no dither of 1×1 pixels to dither processing comprising m×n pixels (m, n are positive integers).

Figure 32:
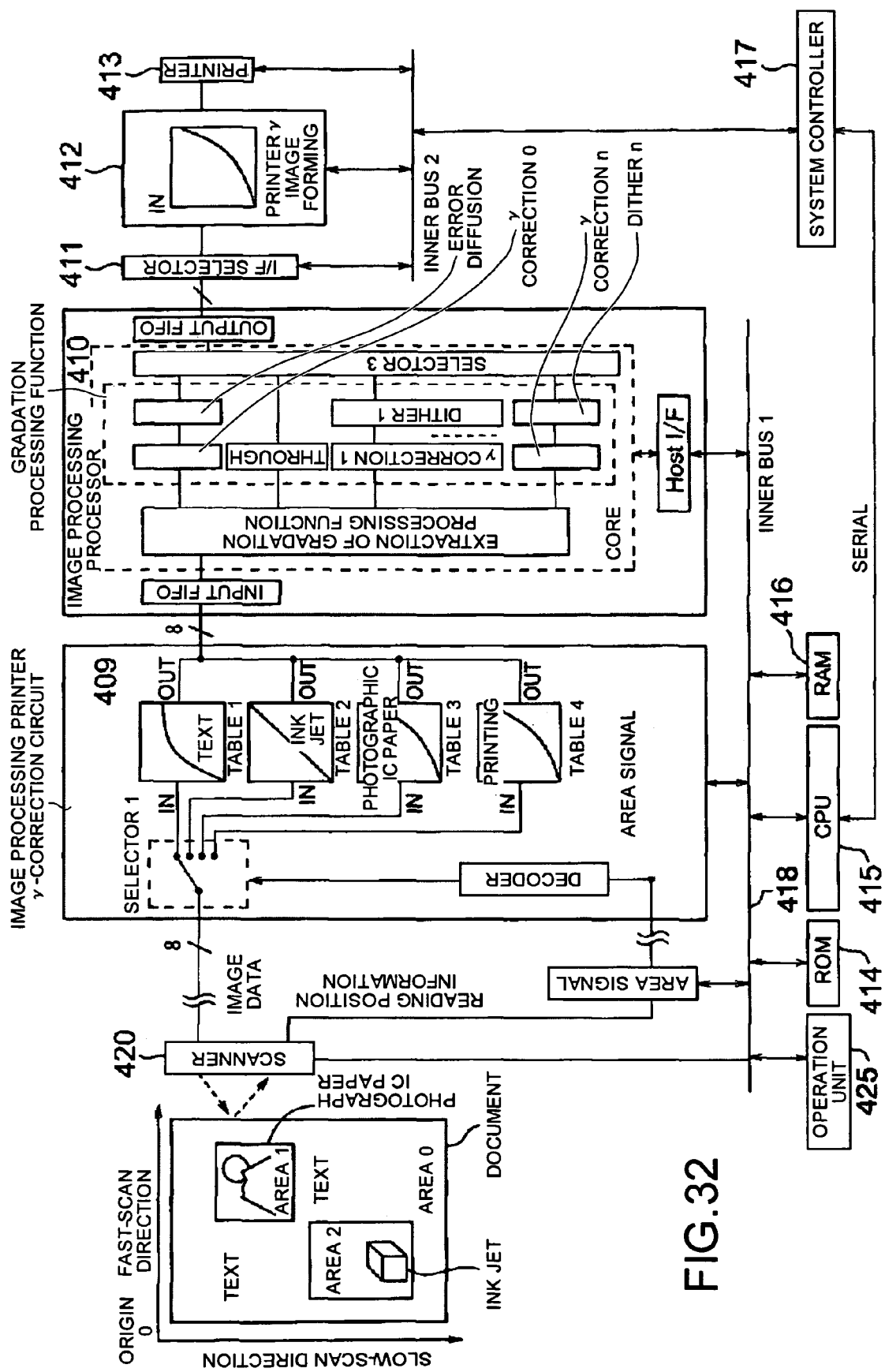
FIG. 32 conceptually shows area processing.

FIG. 32 conceptually shows area processing.

In the structure shown in the same drawing, the area information specified on the document is compared with the reading position information at the time of image reading, and the area signal is output from the area processing circuit 423. Based on the area signal, parameters used for the scanner γ-conversion circuit 402, MTF filter circuit 405, color conversion UCR circuit 406, image processing circuit 408, image processing printer γ-correction circuit 409, and gradation processing circuit 410 are changed. In the structure shown in FIG. 32, in particular, the image processing printer γ-correction circuit 409 and gradation processing circuit 410 are illustrated.

In the structure shown in the image processing printer γ-correction circuit 409, the area signal from the area processing circuit 423 is decoded by a decoder 1, and parameters are chosen from a plurality of gradation conversion tables such as text, ink jet, etc. In the example of the document of FIG. 32, a case in which text area 0, photographic paper area 1, and ink jet area 2 exist is illustrated. For the text area 0, gradation conversion table for text 1, for the area 1 of photographic paper, photographic paper gradation conversion table 3, and for the area 2 of ink jet, an ink jet gradation conversion table 2 are chosen, respectively, as one example.

The image signal which is degradation converted at the image processing printer γ-correction circuit 409 has the degradation processing used switched by a selector 2 not illustrated on the basis of the signals which are decoded by the decoder 2 not illustrated in response to the area signal again in the gradation processing circuit 410. For the applicable gradation processing, processing not using dither, processing in which dither is carried out, and error diffusion processing can be mentioned. Error diffusion processing is carried out against ink jet document.

The gradation-processed image signal choose line 1 or line 2 by the decoder 3 in compliance with the reading position information. Line 1 and line 2 are changed over every time one pixel differs in the slow-scan direction. The data of line 1 is temporarily stored in the FIFO (first-in first-out) memory located downstream the selector 3, and the data on line 1 and line 2 are output. By this, it is possible to reduce the pixel frequency to one half and enter the I/F selector 411.

By the way, the interface I/F-selector 411 has selector functions for outputting the image data read by scanner 420 to process in the external image processing system or outputting the image data from the external host computer or image processing system to the printer 413.

The image forming printer γ-correction circuit 412 converts the image signal from the I/F selector 411 by the gradation conversion table and outputs the signal to the laser modulation circuit later described. The printer unit comprises an I/F selector 411, process computer γ-correction circuit 412, printer 413, and controller 417, and can be used independently from the scanner-IPU. The image signals from host computer 418 are entered into the I/F selector411 via printer controller 419, has gradation converted by the process computer γ-correction circuit 412, and the image is formed by the printer 413, thereby enabling it to be used as a printer.

The above-mentioned image processing circuit is controlled by CPU415. CPU 415 is connected to ROM 414, RAM 416 and BUS 418. In addition, CPU 415 is connected to the system controller 417 via serial I/F, and commands are transmitted from the operation unit not illustrated via system controller 417. Based on the transmitted picture quality mode, density information, and area information, etc., various parameters are set for the relevant image processors. In addition, the pattern generation circuit 421 generates gradation patterns used at the image processor. By the way, reference numeral 425 denotes the operation unit.

Figure 33:
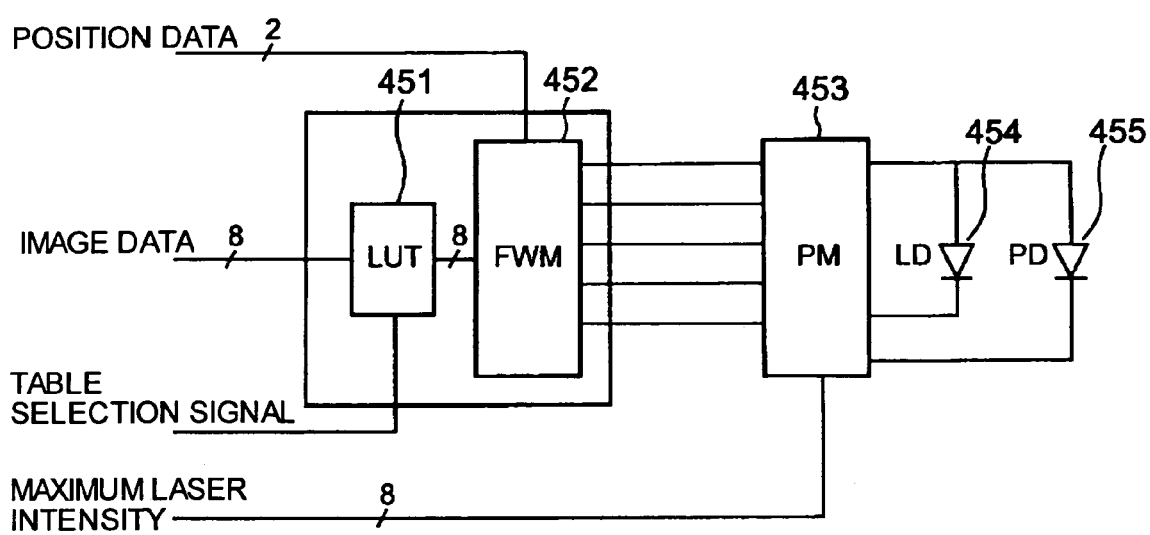
FIG. 33 is a bock diagram to explain a configuration of the laser modulation circuit.

FIG. 33 is a block diagram to explain a configuration of the laser modulation circuit.

The writing frequency of this laser modulation circuit is 18.4 MHz, and the scan time for one pixel is 53.8 nsec. The 8-bit image data can be γ-converted at the look up table (LUT) 451. The image data is converted into 8-value pulse width based on the high 3-bit signal of the 8-bit image signal at the pulse width modulation circuit (PWM) 452 and has the 32-value power modulation carried out at low 5-bits at the power modulation circuit (PM), and a laser diode (LD) 454 emits light based on the signal modulated. At the photo detector (PD) 455, the light-emitting intensity is monitored and corrected dot by dot. The maximum laser beam intensity can be varied to 8 bits (256 stages) independently from the image signals.

With respect to the beam diameter in the fast-scan direction (this is defined as a width when the beam intensity is attenuated to $1/e^2$ to the maximum at the time of standstill) with respect to the size of one pixel, beam diameter of 50 μm in the fast-scan direction and that of 60 μm in the slow-scan direction are used when one pixel is 42.3 μm at the 600 DPI pixel density. By the way, to meet the image data of the specified line 1 and line 2, the above-mentioned laser modulation circuit is made available. The image data of line 1 and line 2 are synchronized and the laser beam is scanned on the photoreceptor 102 in parallel with the fast-scan direction.

Figure 34:
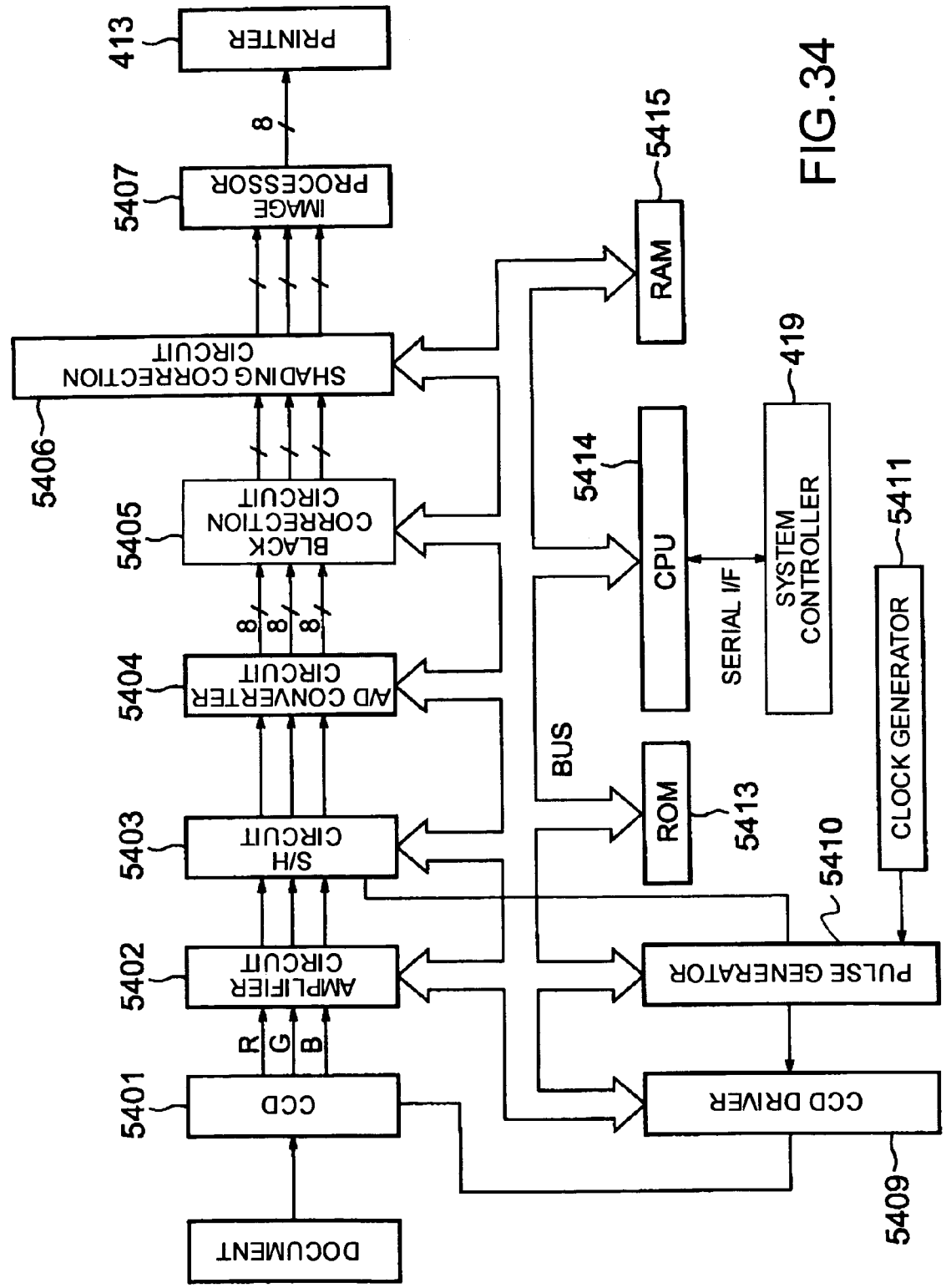
FIG. 34 is a block diagram to explain a general configuration of the image reading system.
Figure 35:
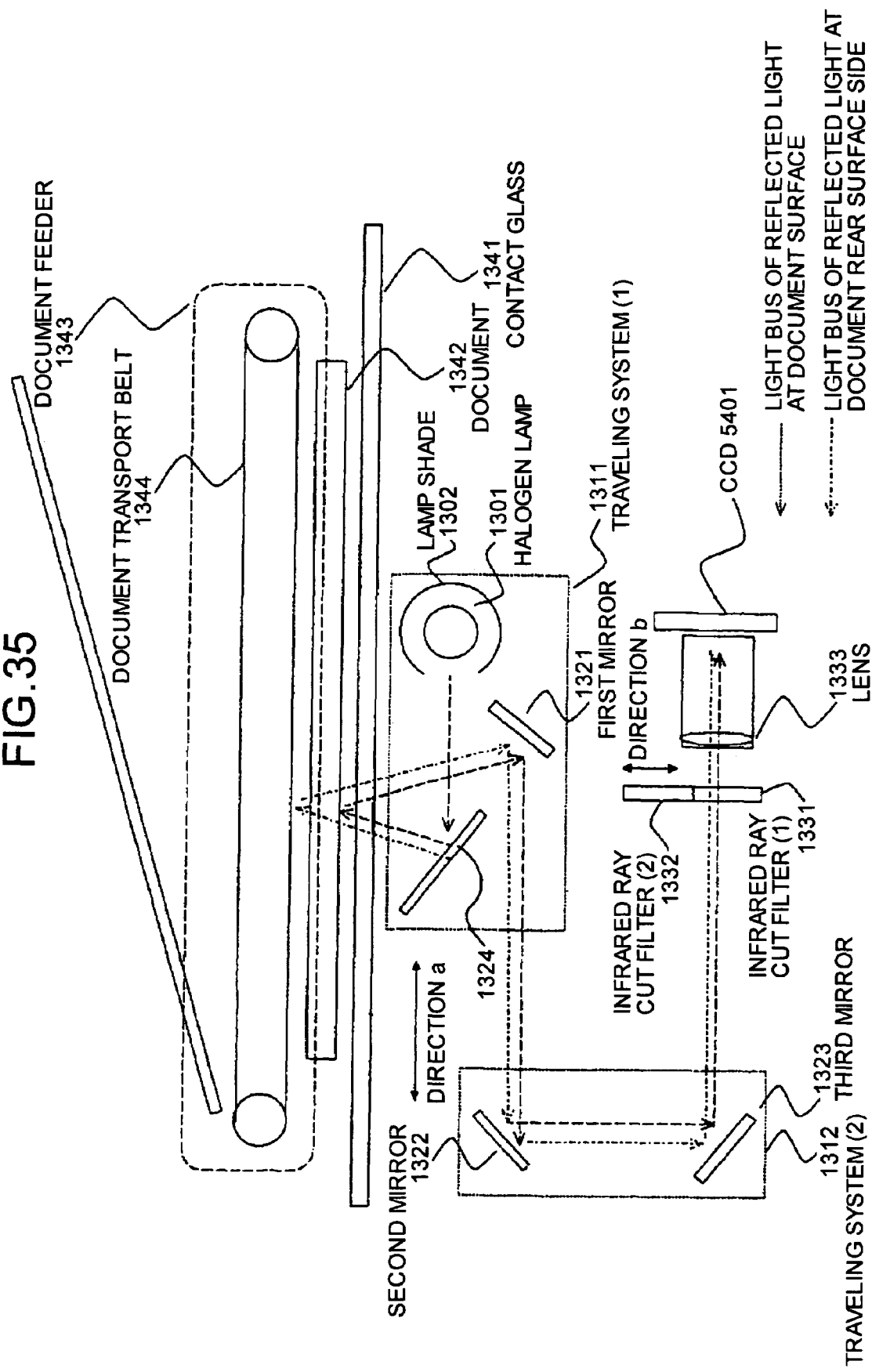
FIG. 35 shows a general mechanical configuration of the image reading system.

FIG. 34 is a block diagram to explain a general configuration of the image reading system, while FIG. 35 shows a general mechanical configuration of the image reading system.

Figure 36:
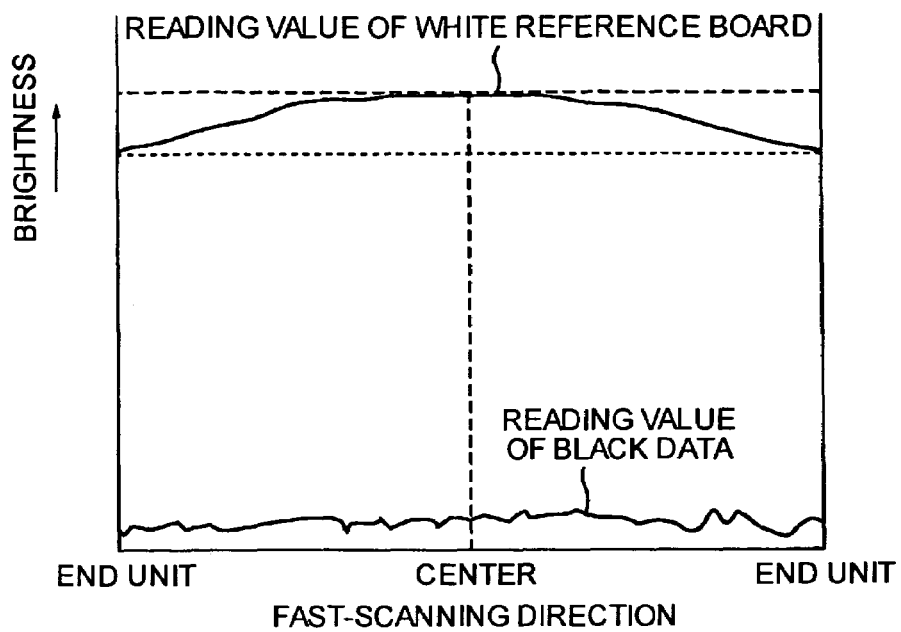
FIG. 36 is an illustration to explain the concept of white correction and black correction of image signals.

The document is irradiated by an exposure lamp (halogen lamp) 1302 in FIG. 35 and the reflected light has color separated by an RGB filter of a CCD (charge coupled device) 5401 and is read, and amplified to a specified level by an amplifier circuit 5402. A CCD driver 5409 supplies pulse signals for driving the CCD. The pulse source necessary for driving the CCD driver 5409 is generated at a pulse generator 5410, and the pulse generator 5410 uses a clock output from the clock generator 5411 which comprises a crystal oscillator, etc. as a reference signal. A pulse generator 5410 supplies the timing necessary for a sample hold (S/H) circuit 5403 to sample-hold the signals from the CCD5401. The analog color image signal which is sample-held by the S/H circuit 5403 is digitized to the 8-bit signal (for an example) at an A/D converter circuit 5404. The black correction circuit 5405 reduces fluctuations of the black level (electric signal when there is only a small volume of light) between pixels and prevents streaks and irregularities from occurring at the black portion of the image. A shading correction circuit 5406 corrects the white level (electric signal when there is a large volume of light). The white level corrects the sensitivity fluctuations of irradiation system, optics system, and CCD 5401 based on the white data when the scanner 420 is moved to the position of uniform white board and irradiates the light. FIG. 36 is a conceptual drawing of image signals of white correction and black correction.

Signals from the shading correction circuit 5406 are processed at an image processor 5407 and output from the printer 413. This circuit is controlled by CPU5414 and stores the data necessary for control in ROM5413 and RAM5415. The CPU5414 communicates with the system controller 419 that carries out control of the whole image forming system by serial I/F. The CPU5414 controls a scanner drive not illustrated and controls the drive of scanner 420.

The amplification rate of an amplifier circuit 5402 is decided in such a manner that the output of the A/D converter circuit 5404 achieves a desired value with respect to a specific document density. For an example, the document whose density at the time of regular copying is 0.05 (0.891 in terms of reflectance) provides value 240 in terms of 8-bit signal value. On the other hand, when shading correction is carried out, the gain is reduced to increase the sensitivity for shading correction. This is because at the gain for the regular copying, the 8-bit image signal of the size exceeding value 255 is saturated with value 255 when there is a large amount of reflected light, and results in errors in shading correction.

The optic system of the scanner 121 primarily comprises the first traveling system 1311 and the second traveling system 1312 which moves following in slow-scan direction at the speed ½ that of the first traveling system, and CCD 5401 which guides the light reflected at the document. To the first traveling system 1311, a halogen lamp 1301 covered by a lamp shade 1302 as a light source, a fourth mirror 1324 for irradiating the document with the light impinging from the halogen lamp 1301, and a first mirror 1321 which receives the reflected light from the document and reflects it to the second traveling system 1312 side are mounted. To the second traveling system 1312, a second mirror 1322 and a third mirror 1323 are mounted, and a light path is formed by the first mirror 1321, the second mirror 1322, and the third mirror 1323, and the reflected light from the document is guided to the CCD 5401. On the upstream side in the light receiving direction of the CCD 5401, two kinds of infrared cut filter 1331, 1332 are mounted, and after the reflected light is allowed to penetrate either of the filters 1331, 1332, it is allowed to impinge on the lens 1333 and the image-formed light is allowed to impinge on the CCD 5401.

At the top of these optic systems, a contact glass 1341 is installed, and a document 1342 is guided by a document transport belt 1344 of a document feeder 1343 and placed on the contact glass 1341. The document is irradiated with light by the halogen lamp 1301 from the lower side (rear surface side) of the contact glass 1341 and reading of the document takes place. Because the detail of the configuration and movements of these are publicly known and the detailed description is omitted here.

In addition, to the contact glass 118 in FIG. 1, the contact glass 1341 corresponds, to the exposure lamp 119, the halogen lamp 1301, to the reflection mirror 121, the first to the third mirrors 1321, 1322, 1323, and to the image-forming lens 122, the lens 1333, respectively.

Figure 37:
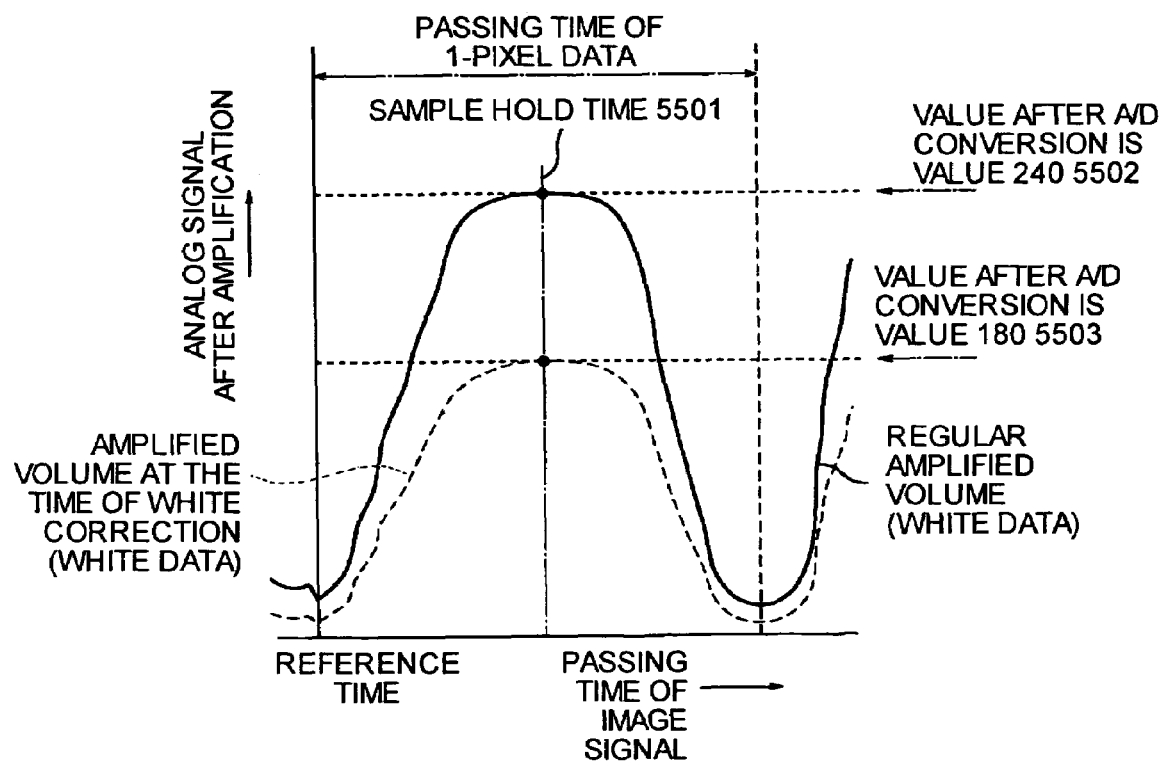
FIG. 37 schematically shows the condition in which reading signal of an image amplified at the amplifier circuit is sample-held at the S/H circuit.

FIG. 37 schematically shows the condition in which reading signal of an image amplified at the amplifier circuit 5402 is sample-held at the S/H circuit 5403. The abscissa is the time in which the amplified analog image signal passes the S/H circuit 5403 and the ordinate is the size of the amplified analog signal. At the specified sample hold time 5501, the analog signal is sample-held and the signal is sent to the A/D converter circuit 5404. The figure shows an example of the image signal of the white level read previously described, and at the time of copying, the amplified image signal is given by the value 240 (5502) as the A/D converted value and by the value 180 (5503) as the white-corrected value.

By the way, the program is downloaded into ROM 131, storage unit 181, program RAM 1405, etc. and executed by CPU 130. In such event, the programs are downloaded from the information recording media such as CD-ROM, etc. in which necessary programs are recorded, or downloaded from a server via network.

As described above, according to the present invention, it is possible to carry out processing in such a manner that YMCK image data flow nearly simultaneously to each of a plurality of photoreceptor drums (image bearers) with an approximate time difference in which the transfer paper moves between photoreceptors.

In addition, in an image processor which processes image data from a plurality of input channels in parallel, error diffusion processing can be carried out using a sequential processor with less number of image data entered.

In addition, it is possible to process the image data by the use of one blue noise data in an image processing system which carries out error diffusion processing in a sequential processor by switching a plurality of image data to be processed in parallel every number of data which can be processed by an SIMD processor (number of SIMD transactions).

Furthermore, because a plurality of image data such as YMCK, etc. are allowed to undergo error diffusion processing at a sequential processing unit, and it is possible to carry out error diffusion processing by the use of a less number of sequential processing units than the number of image signals of the image data to be processed in parallel and it is possible to add a blue noise data and to carry out error diffusion processing using a less number of error diffusion processing units than the number of color data to be processed in parallel, it becomes possible to reduce cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing system comprising:
   an image input unit having a plurality of image input channels;
   a parallel image data processing unit that receives image data from the image input channels of the image input unit, divides the image data received from each of the input channels into a plurality of divided data, the number of divided data being less than a predetermined number of data that can be processed in parallel at a time, and processes in parallel the divided image data; and a sequential image data processing unit that sequentially processes the divided image data output from the image parallel data processing unit while switching the divided image data for the image input channels.

2. The image processing system according to claim 1, wherein the sequential image data processing unit carries out error diffusion processing between a target pixel and other pixels in pixel line of the target pixel.

3. The image processing system according to claim 2, further comprising:
a storage unit that stores error data obtained by the error diffusion processing in compliance with the number of image data processed in parallel,
wherein the sequential image data processing unit retrieves the error data stored for every input channel from the storage unit when performing the error diffusion processing.

4. The image processing system according to claim 1, further comprising:
a blue noise processing unit that carries out blue noise processing;
a blue noise data reading position designating unit that points a blue noise data reading position by the blue noise processing unit in parallel; and
a reading position storage unit that stores the blue noise reading position for each image data to be processed in parallel,
wherein the reading position storage unit stores the blue noise data reading position that corresponds to relevant image data at the time of blue-noise-processing the image data to be processed in parallel.

5. An image forming system comprising:
an image processing system including
an image input unit having a plurality of image input channels;
a parallel image data processing unit that receives image data from the image input channels of the image input unit, divides the image data received from each of the input channels into a plurality of divided data, the number of divided data being less than a predetermined number of data that can be processed in parallel at a time, and processes in parallel the divided image data; and
a sequential image data processing unit that sequentially processes and outputs the divided image data output from the image parallel data processing unit while switching the divided image data for the image input channels; and
an image forming unit that forms visible images on a recording medium using the image data output by the image processing system.

6. An image processing method comprising:
receiving image data from a plurality of image input channels;
dividing the image data received from each of the input channels into a plurality of divided data, the number of divided data being less than a predetermined number of data that can be processed in parallel at a time;
processing in parallel the divided image data; and
sequentially processing the divided image data processed at the processing while switching the divided image data for the image input channels.

7. The image processing method according to claim 6, wherein the sequentially processing includes carrying out error diffusion processing between a target pixel and other pixels in pixel line of the target pixel.

8. The image processing method according to claim 7, further comprising storing error data obtained by the error diffusion processing in compliance with the number of image data processed in parallel,
wherein the sequentially processing includes retrieving the error data stored for every input channel when performing the error diffusion processing.

9. The image processing method according to claim 6, further comprising:
performing blue noise processing;
designating a blue noise data reading position for performing the blue noise processing; and
storing the blue noise reading position, for each image data to be processed in parallel, that corresponds to relevant image data at the time of blue-noise-processing the image data to be processed in parallel.

10. A computer-readable recording medium that stores a computer program that makes a computer execute:
receiving image data from a plurality of image input channels;
dividing the image data received from each of the input channels into a plurality of divided data, the number of divided data being less than a predetermined number of data that can be processed in parallel at a time;
processing in parallel the divided image data; and
sequentially processing the divided image data processed at the processing while switching the divided image data for the image input channels.

11. The computer-readable recording medium that stores a computer program according to claim 10, wherein the sequentially processing includes carrying out error diffusion processing between a target pixel and other pixels in pixel line of the target pixel.

12. The computer-readable recording medium that stores a computer program according to claim 11, further makes the computer execute storing error data obtained by the error diffusion processing in compliance with the number of image data processed in parallel,
wherein the sequentially processing includes retrieving the error data stored for every input channel when performing the error diffusion processing.

13. The computer-readable recording medium that stores a computer program according to claim 10, further makes the computer execute:
performing blue noise processing;
designating a blue noise data reading position for performing the blue noise processing; and
storing the blue noise reading position, for each image data to be processed in parallel, that corresponds to relevant image data at the time of blue-noise-processing the image data to be processed in parallel.

* * * * *